(12) United States Patent
Wang

(10) Patent No.: US 12,194,777 B2
(45) Date of Patent: Jan. 14, 2025

(54) MECANUM WHEEL, CHASSIS, AND ASSISTANT ROBOT

(71) Applicant: Hangzhou RoboCT Technology Development Co., Ltd., Zhejiang (CN)

(72) Inventor: Tian Wang, Heilongjiang (CN)

(73) Assignee: Hangzhou RoboCT Technology Development Co., Ltd., Zhejiang (CN)

( * ) Notice: Subject to any disclaimer, the term of this patent is extended or adjusted under 35 U.S.C. 154(b) by 894 days.

(21) Appl. No.: 17/251,567

(22) PCT Filed: Dec. 26, 2018

(86) PCT No.: PCT/CN2018/124019
§ 371 (c)(1),
(2) Date: Dec. 11, 2020

(87) PCT Pub. No.: WO2019/237715
PCT Pub. Date: Dec. 19, 2019

(65) Prior Publication Data
US 2021/0252910 A1  Aug. 19, 2021

(30) Foreign Application Priority Data

Jun. 12, 2018  (CN) .......................... 201810619557.1

(51) Int. Cl.
| | |
|---|---|
| *B60B 19/12* | (2006.01) |
| *A61G 5/04* | (2013.01) |
| *A61G 5/10* | (2006.01) |
| *A61G 5/12* | (2006.01) |
| *B25J 5/00* | (2006.01) |
| *B25J 11/00* | (2006.01) |

(Continued)

(52) U.S. Cl.
CPC ............ B60B 19/125 (2013.01); A61G 5/046 (2013.01); A61G 5/1078 (2016.11); A61G 5/127 (2016.11);
(Continued)

(58) Field of Classification Search
CPC ... B60B 19/003; B60B 19/125; A61G 5/1078; A61G 5/122; A61G 5/127; A61G 5/128; A61G 5/046
See application file for complete search history.

(56) References Cited

U.S. PATENT DOCUMENTS 4,258,815 A * 3/1981 Wier ...................... B60B 19/003
180/242
5,489,258 A * 2/1996 Wohnsen ............. A61G 7/1051
602/5

(Continued)

FOREIGN PATENT DOCUMENTS

| CN | 106739781 A | 5/2017 |
| CN | 206201833 U | 5/2017 |

(Continued)

*Primary Examiner* — Jason R Bellinger
(74) *Attorney, Agent, or Firm* — ArentFox Schiff LLP; Michael Fainberg

(57) ABSTRACT

Disclosed is a mecanum wheel, including a mecanum wheel body and a drive device. A wheel axle hole is formed in the mecanum wheel body. The drive device is partially or completely arranged in the wheel axle hole. The axis of a connecting shaft of the drive device is collinear with a rotary shaft of the mecanum wheel body, and the mecanum wheel body rotates along with a housing of the drive device. Further disclosed are a mecanum wheel with a shock absorbing device, a chassis including at least one pair of mecanum wheels, and an assistant robot including a chassis.

12 Claims, 18 Drawing Sheets

(51) Int. Cl.
    *B60B 19/00*        (2006.01)
    *F16F 7/104*        (2006.01)
(52) U.S. Cl.
    CPC .............. *A61G 5/128* (2016.11); *B25J 5/007*
        (2013.01); *B25J 11/009* (2013.01); *B60B*
        *19/003* (2013.01); *F16F 7/104* (2013.01)

(56) References Cited

U.S. PATENT DOCUMENTS

| | | | |
|---|---|---|---|
| 7,036,512 B2 * | 5/2006 | Harnois | A61G 5/128 |
| | | | 601/24 |
| 8,833,862 B2 * | 9/2014 | Gunther | B60B 19/125 |
| | | | 301/5.23 |
| 9,796,235 B2 * | 10/2017 | Matayoshi | B60G 15/067 |
| 10,555,849 B2 * | 2/2020 | Zhang | A61G 5/10 |
| 11,173,080 B2 * | 11/2021 | Raja | B60B 35/1045 |
| 2016/0270988 A1 * | 9/2016 | Diaz-Flores | A61G 5/1024 |

FOREIGN PATENT DOCUMENTS

| | | |
|---|---|---|
| CN | 107031383 A | 8/2017 |
| CN | 206436756 U | 8/2017 |
| CN | 206856400 U | 1/2018 |
| CN | 108045187 A | 5/2018 |
| CN | 108749482 A | 11/2018 |

* cited by examiner

MECANUM WHEEL, CHASSIS, AND ASSISTANT ROBOT

CROSS-REFERENCE TO RELATED APPLICATIONS

The present disclosure claims priority to Chinese Patent Application No. 2018106195571, filed with China National Intellectual Property Administration on Jun. 12, 2018 and entitled "MECANUM WHEEL, CHASSIS, AND ASSISTANT ROBOT", which is incorporated herein by reference in its entirety.

TECHNICAL FIELD

The present disclosure relates to the technical field of assisting mechanical accessories, and in particular, to a mecanum wheel, a chassis, and an assistant robot.

BACKGROUND

At present, most of the elderly with mobility difficulties, the disabled, and paralyzed patients generally need specialized personnel for care in daily life, and are unable to take care of themselves in normal daily life. Common walking aids on the market are wheelchairs and electric wheelchairs. They help walk to a great extent, but long-term use of the wheelchairs will lead to blood obstruction to trigger complications, such as pressure sores and osteoporosis, thereby greatly affecting health and bringing inconvenience in sitting in the wheelchairs in daily life, such as defecating and moving in narrow space. Therefore, the appearance of the robot greatly facilitates the life of the elderly with mobility difficulties, the disabled, and the paralyzed patients.

A mecanum wheel is an omni-directional moving wheel, which can realize the movement manners of forward, transverse, and slant movement, rotation, a combination thereof, or the like. The omni-directional moving manner is based on a principle that there is a center wheel with many rollers located on a peripheral wheel axle of a wheel, and part of a wheel steering force of the angled peripheral wheel axle is transformed into a wheel normal force. The mecanum wheel synthesizes to generate a resultant force vector in any required direction depending on the direction and speed of respective rollers, which ensures that it can move freely in the direction of the final resultant force vector without changing the direction of the wheel itself.

However, the current mecanum wheel and its drive motor are designed separately, and their structural sizes are relatively large, which affects the structural size of equipment mounted with the mecanum wheel. Particularly, for the assistant robot, the mecanum wheel and its drive motor with relatively large structural sizes affect the performance of a compact structure of the assistant robot.

Therefore, the present disclosure provides a mecanum wheel, a chassis, and an assistant robot with respect to the above-mentioned problems, so as to reduce the structural sizes of the mecanum wheel and its drive motor.

SUMMARY

The objectives of the present disclosure include, for example, providing a mecanum wheel, to solve the technical problem that the structural sizes of the mecanum wheel and its drive motor are relatively large in the prior art.

The objectives of the present disclosure further include providing a mecanum wheel with a shock absorbing device to solve the technical problem that the structural sizes of the mecanum wheel and its drive motor are relatively large in the prior art.

The objectives of the present disclosure further include providing a chassis and an assistant robot to solve the technical problem that the structural sizes of the mecanum wheel and its drive motor are relatively large in the prior art.

The embodiments of the present disclosure are implemented as follows:

The embodiments of the present disclosure provide a mecanum wheel, including a mecanum wheel body and a drive device;

a wheel axle hole is formed in the mecanum wheel body. The drive device is partially or completely arranged in the wheel axle hole;
the axis of a connecting shaft of the drive device is collinear with a rotary shaft of the mecanum wheel body; the mecanum wheel body rotates along with a housing of the drive device.

Optionally, the mecanum wheel body includes a first end cover, a second end cover, and a plurality of mecanum rollers;
the plurality of the mecanum rollers are connected between the first end cover and the second end cover;
the plurality of the mecanum rollers form the wheel axle hole;
the connecting shaft of the drive device extends out from the first end cover, and the housing of the drive device is detachably connected to the first end cover.

Optionally, end cover hole slots with the number corresponding to that of the mecanum rollers are formed in the first end cover and/or the second end cover;
roller shafts of the mecanum rollers are in fit connection with the end cover hole slots;
in the radial direction of the first end cover or the second end cover, the end cover hole slots are opened in the edge of the first end cover or the second end cover and form edge notches, so that the roller shafts of the mecanum rollers may enter the end cover hole slots from the edge notches.

Optionally, in the radial direction of the mecanum roller, the size of the edge notch is greater than or equal to the maximum size of the roller shaft of the mecanum roller.

Optionally, in the radial direction of the mecanum roller, the cross section of the end cover hole slot is triangular, rectangular, or semicircular;
the cross section, fitting the end cover hole slot, of the roller shaft of the mecanum roller is in a shape corresponding to that of the cross section of the end cover hole slot.

Optionally, in the radial direction of the mecanum roller, the roller shaft of the mecanum roller is provided with a roller shaft assembling platform;
the roller shaft assembling platform is provided with a screw that is in threaded connection with the first end cover or the second end cover.

Optionally, the housing of the drive device is detachably connected to the first end cover by screws;
the housing of the drive device is detachably connected to the second end cover by screws.

Optionally, the first end cover is provided with a first end cover fitting groove, the housing of the drive device is provided with a first drive fitting structure corresponding to the first end cover fitting groove; the first end cover fitting groove extends in the axial direction of the connecting shaft of the drive device;

or, the first end is provided with a first end cover fitting bump, and the housing of the drive device is provided with a first drive fitting groove corresponding to the first end cover fitting bump; the first end cover fitting bump extends in the axial direction of the connecting shaft of the drive device.

Optionally, the second end cover is provided with a second end cover fitting groove, and the housing of the drive device is provided with a second drive fitting structure corresponding to second end cover fitting groove; the second end cover fitting groove extends in the axial direction of the connecting shaft of the drive device;

or, the second end cover is provided with a second end cover fitting bump, the housing of the drive device is provided with a second drive fitting groove corresponding to second end cover fitting bump; the second end cover fitting bump extends in the axial direction of the connecting shaft of the drive device.

Optionally, the drive device includes a hub motor; the connecting shaft of the drive device is a connecting shaft of the hub motor; the hub motor is arranged in the wheel axle hole; the mecanum wheel body rotates along with a housing of the hub motor;

or, the drive device includes a hub motor and a speed reducer; the hub motor is connected to the speed reducer and drives the speed reducer; the connecting shaft of the drive device is a connecting shaft of the hub motor; the hub motor is arranged in the wheel axle hole; the speed reducer is partially or completely arranged in the wheel axle hole; the mecanum wheel body rotates along with a housing of the hub motor.

Optionally, the hub motor includes an inner stator connecting shaft and an outer rotor housing;

in the axial direction of the inner stator connecting shaft, the first end cover and/or the second end cover are respectively connected to two ends of the outer rotor housing by screws.

the inner stator connecting shaft extends out of the first end cover, and the axis of the inner stator connecting shaft is collinear with the rotary shaft of the mecanum wheel body;

when the hub motor works, the first end cover and the second end cover rotate around the inner stator connecting shaft along with the outer rotor housing.

The embodiments of the present disclosure provide a shock absorbing device, including a shock absorbing fixed bracket and a shock absorbing moving bracket; the shock absorbing moving bracket is configured to be fixedly connected to a connecting shaft of a wheel;

the shock absorbing fixed bracket includes at least one shock absorbing fixed shaft; the shock absorbing moving bracket is arranged outside the shock absorbing fixed shaft in a sleeving manner and may move reciprocally in the longitudinal direction of the shock absorbing fixed shaft;

two elastic elements are arranged outside the shock absorbing fixed shaft in a sleeving manner; the shock absorbing moving bracket is connected between the two elastic elements;

the longitudinal direction of the shock absorbing fixed shaft and the axial direction of the connecting shaft of the wheel are arranged at an included angle.

Optionally, the shock absorbing fixed bracket includes a first shock absorbing fixed part, a second shock absorbing fixed part, and a third shock absorbing fixed part;

the first shock absorbing fixed part is fixedly connected to the second shock absorbing fixed part through the shock absorbing fixed shaft;

the third shock absorbing fixed part is fixedly connected to the first shock absorbing fixed part and the second shock absorbing fixed part.

Optionally, the second shock absorbing fixed part is detachably and fixedly connected to the third shock absorbing fixed part, and at least one shock absorbing adjusting piece is arranged between the second shock absorbing fixed part and the third shock absorbing fixed part;

the shock absorbing adjusting piece includes a wedge-shaped structure;

in the longitudinal direction of the shock absorbing fixed shaft, the shock absorbing adjusting piece may be moved to change the distance between the second shock absorbing fixed part and the third shock absorbing fixed part.

Optionally, the shock absorbing adjusting piece includes an adjusting fitting part and an adjusting threaded part that is fixedly connected to the adjusting fitting part; the adjusting fitting part is of a wedge-shaped structure;

the adjusting fitting part is arranged between the second shock absorbing fixed part and the third shock absorbing fixed part;

the adjusting threaded part is in threaded connection with an adjusting nut; the adjusting nut is pressed against one surface, far away from the shock absorbing moving bracket, of the second shock absorbing fixed part;

when the adjusting nut is rotated, the shock absorbing adjusting piece may be moved to change the distance between the second shock absorbing fixed part and the third shock absorbing fixed part.

Optionally, an adjusting through hole is formed in the adjusting fitting part;

a screw for connecting the second shock absorbing fixed part and the third shock absorbing fixed part is plugged in the adjusting through hole.

Optionally, an adjusting fitting protrusion part is formed at one end, far away from the adjusting threaded part, of the adjusting fitting part;

the adjusting fitting protrusion part is protruded from the wedge-shaped surface of the adjusting fitting part;

the wedge-shaped surface of the adjusting fitting part is connected to the second shock absorbing fixed part.

Optionally, the shock absorbing fixed bracket includes a shock absorbing mounting piece; the shock absorbing mounting piece, the first shock absorbing fixed part, and the second shock absorbing fixed part are arranged on the shock absorbing fixed shaft at intervals in sequence;

equipment is fixedly connected between the shock absorbing mounting piece and the first shock absorbing fixed part.

Optionally, the shock absorbing device includes a shock absorbing fixed bracket and a shock absorbing moving bracket; the shock absorbing moving bracket is fixedly connected to a connecting shaft of a drive device of the mecanum wheel;

the shock absorbing fixed bracket includes at least one shock absorbing fixed shaft; the shock absorbing moving bracket is arranged outside the shock absorbing fixed shaft in a sleeving manner and may move reciprocally in the longitudinal direction of the shock absorbing fixed shaft;

elastic elements which are pressed against the shock absorbing moving bracket are arranged outside the shock absorbing fixed shaft in a sleeving manner; the elastic elements are in a compressed state;

the longitudinal direction of the shock absorbing fixed shaft and the axial direction of the connecting shaft of the drive device are arranged at an included angle.

Optionally, the shock absorbing fixed bracket includes a shock absorbing fixing leveling mounting piece and a shock absorbing fixing leveling shafting piece;

the shock absorbing fixing leveling mounting piece is configured to be fixedly connected to the equipment.

the shock absorbing fixing leveling shafting piece is detachably and fixedly connected to the shock absorbing fixed shaft; a shock absorbing fixed shaft stop part is formed at one end, far away from the shock absorbing fixing leveling shafting piece, of the shock absorbing fixed shaft; the elastic elements and the shock absorbing moving bracket are arranged between the shock absorbing fixed shaft stop part and the shock absorbing fixing leveling shafting piece;

the shock absorbing fixing leveling mounting piece is hinged to the shock absorbing fixing leveling shafting piece, and the shock absorbing fixing leveling mounting piece and the shock absorbing fixing leveling shafting piece are connected to a leveling connecting piece; the leveling connecting piece may adjust the angle between the shock absorbing fixing leveling mounting piece and the shock absorbing fixing leveling shafting piece.

Optionally, the leveling connecting piece is in threaded connection with the shock absorbing fixing leveling mounting piece, and the leveling connecting piece may penetrate through the shock absorbing fixing leveling mounting piece to press against the shock absorbing fixing leveling shafting piece.

Optionally, the shock absorbing fixing leveling mounting piece is connected to the shock absorbing fixing leveling shafting piece through at least one leveling connecting screw;

a circular hole, a strip-shaped hole, or a slotted hole for plugging the leveling connecting screw is formed in the shock absorbing fixing leveling mounting piece;

a threaded hole that is in threaded connection with the leveling connecting screw is formed in the shock absorbing fixing leveling shafting piece, or one surface, far away from the shock absorbing fixing leveling mounting piece, of the shock absorbing fixing leveling shafting piece is connected to a nut that is in threaded connection with the leveling connecting screw.

Optionally, the elastic elements are springs;

an energy absorbing element is arranged outside the shock absorbing fixed shaft in a sleeving manner; the energy absorbing element may deform elastically;

the shock absorbing moving bracket is arranged between the energy absorbing elements and the elastic elements.

Optionally, a gasket is arranged outside the shock absorbing fixed shaft in a sleeving manner;

the energy absorbing element includes a polyurethane structural part, a rubber loop, or a silicone loop.

the shock absorbing fixed shaft stop part, the gasket, the energy absorbing element, the shock absorbing moving bracket, the elastic elements, and the shock absorbing fixing leveling shafting piece are arranged in sequence in the longitudinal direction of the shock absorbing fixed shaft.

Optionally, the elastic elements are arranged between the shock absorbing moving bracket and the shock absorbing fixing leveling shafting piece; counterbores that are in fit connection with the elastic elements are formed in the shock absorbing moving bracket and/or the shock absorbing fixing leveling shafting piece.

Optionally, a shock absorbing fixed shaft threaded part is arranged at one end, far away from the shock absorbing fixed shaft stop part, of the shock absorbing fixing leveling shafting piece; a threaded hole that is in threaded connection with the shock absorbing fixed shaft threaded part is formed in the shock absorbing fixing leveling shafting piece;

and/or a bearing is arranged between the shock absorbing moving bracket and the shock absorbing fixed shaft.

Optionally, the shock absorbing moving bracket includes a shock absorbing moving bracket connecting part and at least two shock absorbing moving bracket sleeving parts; a connecting shaft of the wheel penetrates through shock absorbing moving bracket connecting part and is fixedly connected to the shock absorbing moving bracket connecting part; the shock absorbing moving bracket sleeving parts are arranged outside the shock absorbing fixed shafts in a sleeving manner, and the number of the shock absorbing moving bracket sleeving parts is corresponding that of the shock absorbing fixed shafts;

adjacent shock absorbing moving bracket sleeving parts are fixedly connected through the shock absorbing moving bracket connecting part;

the shock absorbing moving bracket connecting part is protruded from a surface formed by the adjacent shock absorbing moving bracket sleeving parts.

Optionally, the number of the shock absorbing fixed shafts is two;

the shock absorbing moving bracket is of a symmetrical structure.

Optionally, the longitudinal direction of the shock absorbing fixed shaft and the axial direction of the connecting shaft of the wheel are arranged at a right angle.

Optionally, the elastic element includes a spring, a polyurethane structural part, a rubber loop, or a silicone loop.

A wheel structure with a shock absorbing device provided by the present disclosure includes a wheel and the shock absorbing device; the wheel is connected to the shock absorbing device.

Optionally, the number of the shock absorbing device is one; the shock absorbing device is arranged on one side of the wheel, and a shock absorbing moving bracket of the shock absorbing device is fixedly connected to a connecting shaft of the wheel;

or, the number of the shock absorbing devices is two; the wheel is arranged between the two shock absorbing devices, and the shock absorbing moving brackets of both shock absorbing devices are fixedly connected to a connecting shaft of the wheel.

The embodiments of the present disclosure further provide a mecanum wheel with a shock absorbing device, including the mecanum wheel, and further including a shock absorbing device; the mecanum wheel is connected to the shock absorbing device.

Optionally, the shock absorbing device includes a shock absorbing fixed bracket and a shock absorbing moving bracket; the shock absorbing moving bracket is fixedly connected to a connecting shaft of a drive device of the mecanum wheel;

the shock absorbing fixed bracket includes at least one shock absorbing fixed shaft; the shock absorbing moving bracket is arranged outside the shock absorbing fixed shaft in a sleeving manner and may move reciprocally in the longitudinal direction of the shock absorbing fixed shaft;

two elastic elements are arranged outside the shock absorbing fixed shaft in a sleeving manner; the shock absorbing moving bracket is connected between the two elastic elements;

the longitudinal direction of the shock absorbing fixed shaft and the axial direction of the connecting shaft of the drive device are arranged at an included angle.

Optionally, the shock absorbing fixed bracket includes a first shock absorbing fixed part, a second shock absorbing fixed part, and a third shock absorbing fixed part;

the first shock absorbing fixed part is fixedly connected to the second shock absorbing fixed part through the shock absorbing fixed shaft;

the third shock absorbing fixed part is fixedly connected to the first shock absorbing fixed part and the second shock absorbing fixed part.

Optionally, the second shock absorbing fixed part is detachably and fixedly connected to the third shock absorbing fixed part, and at least one shock absorbing adjusting piece is arranged between the second shock absorbing fixed part and the third shock absorbing fixed part;

the shock absorbing adjusting piece includes a wedge-shaped structure;

in the longitudinal direction of the shock absorbing fixed shaft, the shock absorbing adjusting piece may be moved to change the distance between the second shock absorbing fixed part and the third shock absorbing fixed part.

Optionally, the shock absorbing adjusting piece includes an adjusting fitting part and an adjusting threaded part that is fixedly connected to the adjusting fitting part; the adjusting fitting part is of a wedge-shaped structure;

the adjusting fitting part is arranged between the second shock absorbing fixed part and the third shock absorbing fixed part;

the adjusting threaded part is in threaded connection with an adjusting nut; the adjusting nut is pressed against one surface, far away from the shock absorbing moving bracket, of the second shock absorbing fixed part;

when the adjusting nut is rotated, the shock absorbing adjusting piece may be moved to change the distance between the second shock absorbing fixed part and the third shock absorbing fixed part.

Optionally, an adjusting through hole is formed in the adjusting fitting part;

a screw for connecting the second shock absorbing fixed part and the third shock absorbing fixed part is plugged in the adjusting through hole.

Optionally, an adjusting fitting protrusion part is formed at one end, far away from the adjusting threaded part, of the adjusting fitting part;

the adjusting fitting protrusion part is protruded from the wedge-shaped surface of the adjusting fitting part;

the wedge-shaped surface of the adjusting fitting part is connected to the second shock absorbing fixed part.

Optionally, the shock absorbing fixed bracket includes a shock absorbing mounting piece; the shock absorbing mounting piece, the first shock absorbing fixed part, and the second shock absorbing fixed part are arranged on the shock absorbing fixed shaft at intervals in sequence;

equipment is fixedly connected between the shock absorbing mounting piece and the first shock absorbing fixed part.

Optionally, the shock absorbing moving bracket includes a shock absorbing moving bracket connecting part and at least two shock absorbing moving bracket sleeving parts; a connecting shaft of the drive device penetrates through the shock absorbing moving bracket connecting part and is fixedly connected to the shock absorbing moving bracket connecting part; the shock absorbing moving bracket sleeving parts are arranged outside the shock absorbing fixed shafts in a sleeving manner, and the number of the shock absorbing moving bracket sleeving parts is corresponding to that of the shock absorbing fixed shafts;

adjacent shock absorbing moving bracket sleeving parts are fixedly connected through the shock absorbing moving bracket connecting part;

the shock absorbing moving bracket connecting part is protruded from a surface formed by the adjacent shock absorbing moving bracket sleeving parts.

Optionally, the number of the shock absorbing fixed shafts is two;

the shock absorbing moving bracket is of a symmetrical structure.

Optionally, the longitudinal direction of the shock absorbing fixed shaft and the axial direction of the connecting shaft of the drive device are arranged at a right angle.

Optionally, the elastic element includes a spring, a polyurethane structural part, a rubber loop, or a silicone loop.

Optionally, the number of the shock absorbing device is one; the shock absorbing device is arranged on one side of the mecanum wheel, and the shock absorbing device is fixedly connected to a connecting shaft of a drive device of the mecanum wheel;

or, the number of the shock absorbing devices is two; the mecanum wheel is arranged between the two shock absorbing devices, and both shock absorbing devices are fixedly connected to a connecting shaft of a drive device of the mecanum wheel.

The embodiments of the present disclosure further provide a chassis, including at least one pair of the mecanum wheels with shock absorbing devices.

Optionally, the chassis includes a chassis cross beam and two fixed beams; the chassis cross beam is fixedly connected to the two fixed beams;

the extension direction of the fixed beams is the traveling direction of the chassis; the fixed beams are connected to the shock absorbing devices of the mecanum wheels with shock absorbing devices;

the pairwise arranged mecanum wheels with shock absorbing devices are arranged at the same ends of the fixed beams, and each of the fixed beams is connected to at least one mecanum wheel with a shock absorbing device.

Optionally, the pairwise arranged mecanum wheels with shock absorbing devices are connected through a chassis wheel axle.

Optionally, two ends of each of the fixed beams are respectively connected to the shock absorbing devices of the mecanum wheels with shock absorbing devices.

Optionally, one end of the fixed beam is connected to the mecanum wheel with a shock absorbing device, and the other end of the fixed beam is connected to a roller through a second shock absorbing device;

the second shock absorbing device includes a strut and a second shock absorber; the end part of the strut is hinged to the second shock absorber;

the strut is hinged to the fixed beam, the second shock absorber is hinged to the fixed beam, a roller shaft of the roller is fixedly connected to the strut.

Optionally, the roller is a mecanum wheel; a connecting shaft of a drive device of the mecanum wheel is fixedly connected to the strut;

the second shock absorber is a hydraulic shock absorber or a spring shock absorber.

The embodiments of the present disclosure further provide an assistant robot, including the chassis.

Optionally, the assistant robot includes a hip supporting strap, a waist holding strap, and a robot body; the chassis and a lifting support mechanism are arranged on the robot body;
the chassis is arranged at the bottom of the robot body;
the lifting support mechanism includes a chest pressing plate; first connecting pieces are arranged on a lower end surface of the chest pressing plate, and second connecting pieces are arranged on a side wall of the chest pressing plate;
the hip supporting strap is provided with third connecting pieces that are matched and butted with the first connecting pieces, the waist holding strap is provided with a fourth connecting pieces that are matched and butted with the second connecting piece.

Optionally, the lifting support mechanism includes: a support rod; one end of the support rod is hinged to the robot body; a console is arranged at the other end of the support rod; the console is connected to handles and the chest pressing plate;
a drive assembly is further connected between the support rod and the robot body; the drive assembly is configured to make the support rod in a first state or a second state, and be capable of switching between the first state and the second state.

Optionally, when the support rod is in the first state, the height of the assistant robot is less than 0.8 meter.

Optionally, the support rod includes a primary rod and a secondary rod that is arranged in the primary rod in a penetrating manner; the secondary rod is connected to the primary rod through a movable piece, and the secondary rod may be moved in the primary rod telescopically and fixed through the movable piece.

Optionally, a power switch and at least two gears of speed regulating switches are arranged on the console;
a groove is formed in the console; the groove may be configured to hold a remote control and charge the remote control.

Optionally, a control assembly is arranged in the robot body; the control assembly is connected to the drive assembly, and is configured to control the support rod to ascend and descend;
the remote control is connected to the control assembly in a wireless connection manner; the remote control may remotely control the assistant robot to move.

Optionally, when the power switch is turned on, the assistant robot is in a braking state by default;
a control switch is arranged on the remote control, and when both the control switch and the power switch are in an on-state, the remote control may remotely control the assistant robot to move, or control the assistant robot to perform posture transformation, horizontal movement, or rotation movement.

Optionally, the chest pressing plate includes: an EVA filling layer, and a leather layer that coats outside the EVA filling layer;
the two sides of the lower end of the chest pressing plate are of arc-shaped structures that are folded upwards.

Optionally, the robot body includes a vehicle body, and the chassis connected to the bottom end area of the vehicle body; the lifting support mechanism is connected to the vehicle body; footrest supporting plate is further arranged on the chassis;
the vehicle body is connected to a knee pressing mechanism;
the knee pressing mechanism includes: a horizontal beam; one end of the horizontal beam is connected to the vehicle body, and the other end of the horizontal beam is connected to a cross beam; two knee pressing plates that are movably connected are symmetrically arranged on the cross beam.

Optionally, the horizontal beam includes: a primary beam and a secondary beam; one end of the primary beam is connected to the vehicle body; one end of the secondary beam is arranged in the primary beam in a penetrating manner, and the other end of the secondary beam is connected to the knee pressing plates;
the secondary beam may drive the knee pressing plates to move in the direction, far away from or close to the vehicle body, relative to the primary beam and be fixed.

Optionally, connecting holes are formed in the cross beam; a strip-shaped groove is longitudinally formed in the knee pressing plate;
when the connecting holes correspond to different positions of the strip-shaped groove and are fixed by bolts, the knee pressing plate is located at different heights;
the knee pressing plate includes an intermediate plate connected to the cross beam, and an inner side plate and an outer side plate that are respectively connected to two sides of the intermediate plate; the size of the outer side plate is greater than that of the inner side plate.

Optionally, a lighting lamp is arranged on the front side of the vehicle body; an indicating lamp is arranged on the vehicle body;
the indicating lamp includes: any one or more of a charging standby state, a startup charging state, a normal startup state, a standby state, and an alarm state;
the assistant robot includes: a sound prompt device; the sound prompt device is configured to prompt the state of the assistant robot, or give a hazard alarm.

Compared with the prior of art, the mecanum wheel, the chassis, and the assistant robot have the following beneficial effects, for example:
the mecanum wheel provided by the embodiments of the present disclosure includes a mecanum wheel body and a drive device; the drive device is partially or completely arranged in a wheel axle hole of the mecanum wheel body to reduce the structural sizes of the mecanum wheel and its drive motor and form the mecanum wheel integrated with a drive device and a mecanum wheel body, thereby making the structure of the equipment, such as an assistant robot, using the mecanum wheel more compact.

The mecanum wheel with a shock absorbing device, the chassis, and the assistant robot provided by the embodiments of the present disclosure have the advantages of compact structure of the mecanum wheel and the like.

BRIEF DESCRIPTION OF THE DRAWINGS

To describe the technical solutions in the embodiments of the present disclosure more clearly, the following briefly introduces the accompanying drawings required for describing the embodiments. It should be noted that the following accompanying drawings only show some embodiments of the present disclosure, thus should not be considered as limitation to a scope. Those of ordinary skill in the art may still derive other relevant accompanying drawings from these accompanying drawings without creative efforts.

DETAILED DESCRIPTION

Figure 1A:
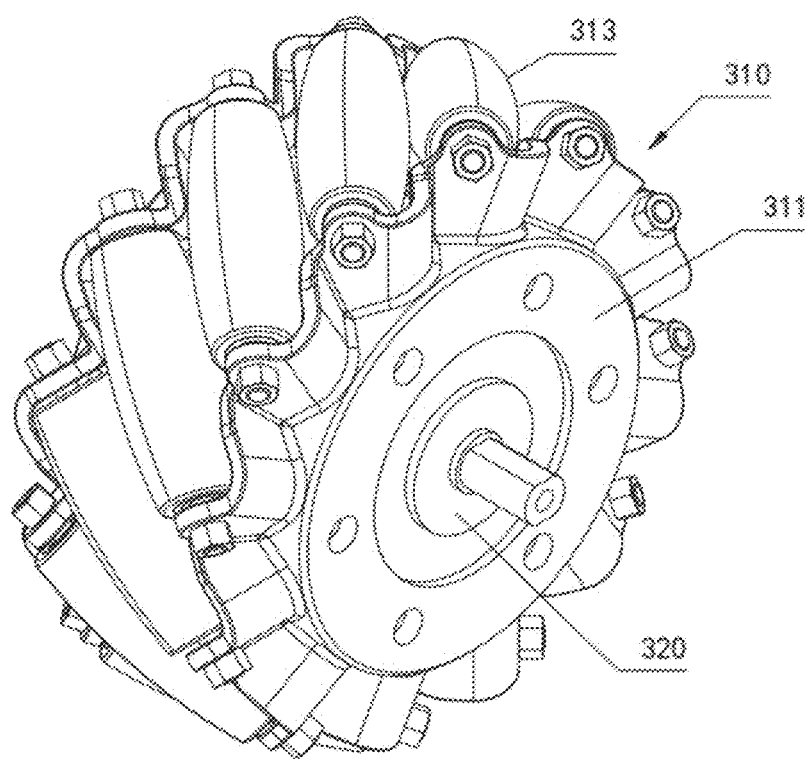
FIG. 1A is a schematic structural diagram of a mecanum wheel provided by the embodiments of the present disclosure.

To make the objectives, technical solutions, and advantages of the embodiments of the present disclosure clearer, the following clearly and completely describes the technical solutions in the embodiments of the present disclosure with reference to the accompanying drawings in the embodiments of the present disclosure. Apparently, the described embodiments are part rather than all of the embodiments of the present disclosure. Typically, the components of the embodiments of the present disclosure, which are described and shown in the accompanying drawings herein, may be arranged and designed in a variety of different configurations.

Therefore, the following detailed description of the embodiments of the present disclosure provided in the accompanying drawings is not intended to limit the scope of protection of the present disclosure, but only represents the selected embodiments of the present disclosure. On the basis of the embodiments of the present disclosure, all other embodiments obtained by those of ordinary skill in the art without creative efforts fall within the protection scope of the present disclosure.

It should be noted that: similar numerals and letters represent similar items in the following accompanying drawings. Therefore, once a certain item is defined in one accompanying drawing, it is unnecessary to further define and explain the certain item in subsequent accompanying drawings.

In the descriptions of the present disclosure, it should be noted that the orientations or positional relationships indicated by the terms "center", "upper", "lower", "left", "right", "vertical", "horizontal", "inner", "outer", and the like are based on the orientations or positional relationships shown in the accompanying drawings, or the customary placement orientations or positional relationships when the product of the present application is used, are only intended to facilitate the descriptions of the present application and simplify the descriptions, rather than indicating or implying that the apparatuses or elements must have specific orientations or must be constructed and operated in specific orientations, and thus may not be interpreted as limitation to the present disclosure.

In addition, terms "first", "second", "third", and the like are only used for distinguishing descriptions, and cannot be understood as indicating or implying relative importance.

In addition, terms "horizontal", "vertical", "overhung", and the like do not mean that the parts are required to be absolutely horizontal or overhung, but may be slightly tilted. For example, "horizontal" only means that its direction is more horizontal relative to "vertical", rather than meaning that the structure must be completely horizontal, but may be slightly tilted.

In the descriptions of the present disclosure, it should be noted that, unless otherwise specified and defined explicitly, terms "arranged", "mounted", "interconnected", and "connected" are to be interpreted broadly, for example, may be fixedly connected, or detachably connected, or integrally connected, may be mechanically connected, or electrically connected, may be directly connected, or indirectly connected through an intermediate medium, or internally communicated between two elements. Those of ordinary skill in the art may understand specific meanings of these terms in the present disclosure in specific situations.

It is should be noted that features in the embodiments of the present disclosure may be combined with each other without conflict.

Figure 1B:
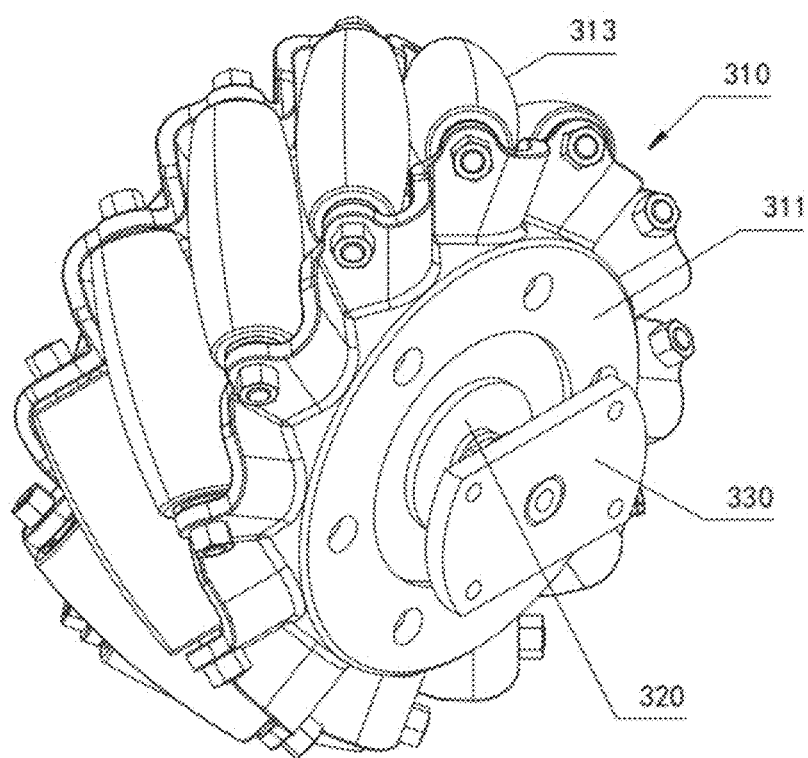
FIG. 1B is an another schematic structural diagram of the mecanum wheel provided by the embodiments of the present disclosure.
Figure 1C:
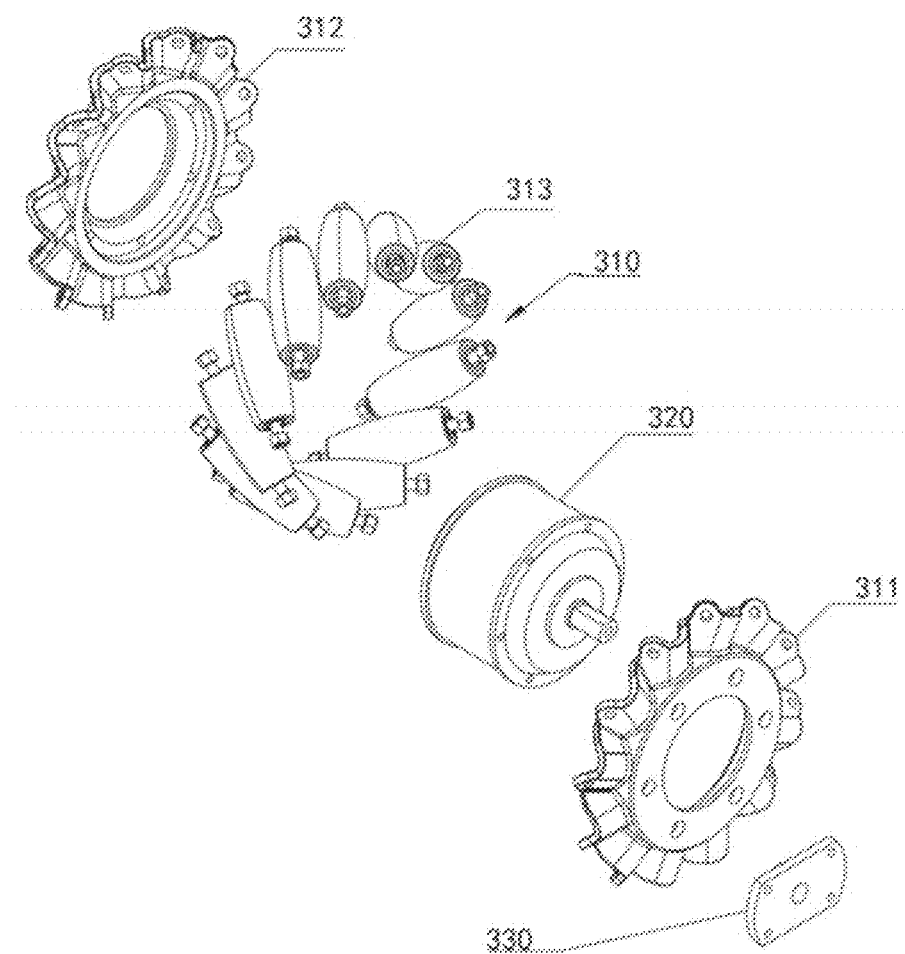
FIG. 1C is an exploded view of the mecanum wheel as shown in FIG. 1B.
Figure 1D:
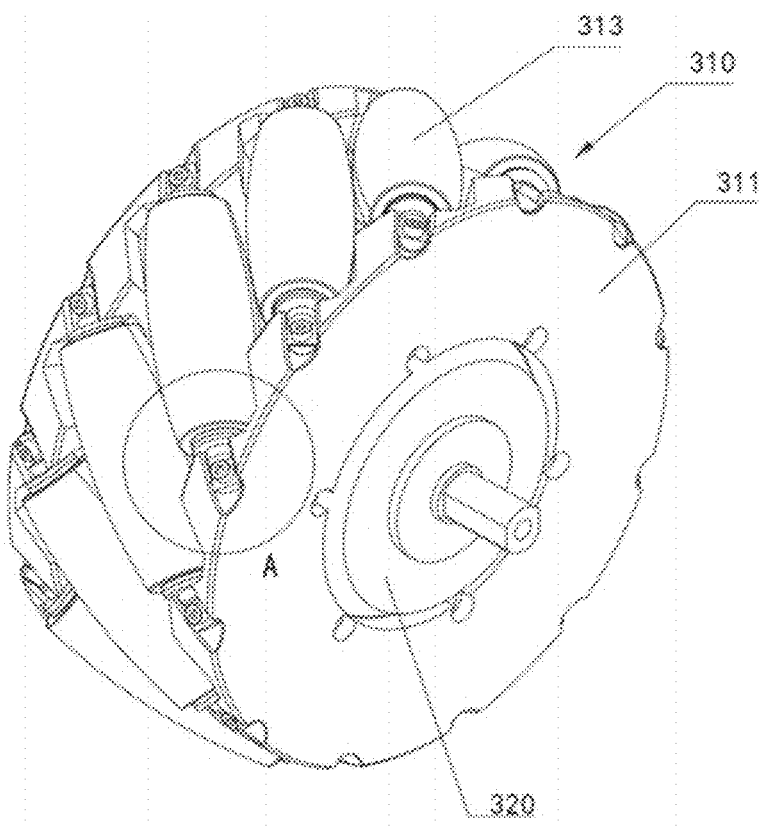
FIG. 1D is a yet another schematic structural diagram of the mecanum wheel provided by the embodiments of the present disclosure.
Figure 1E:
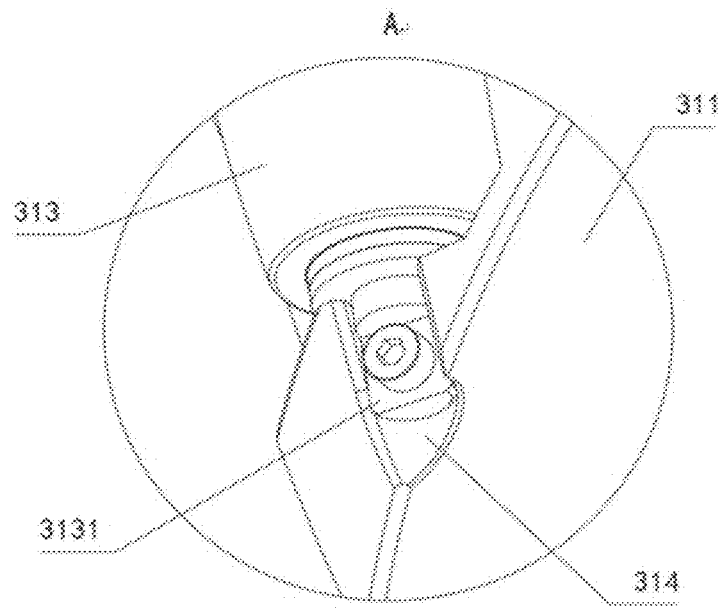
FIG. 1E is an enlarged view of a region A of the mecanum wheel as shown in FIG. 1D.
Figure 1F:
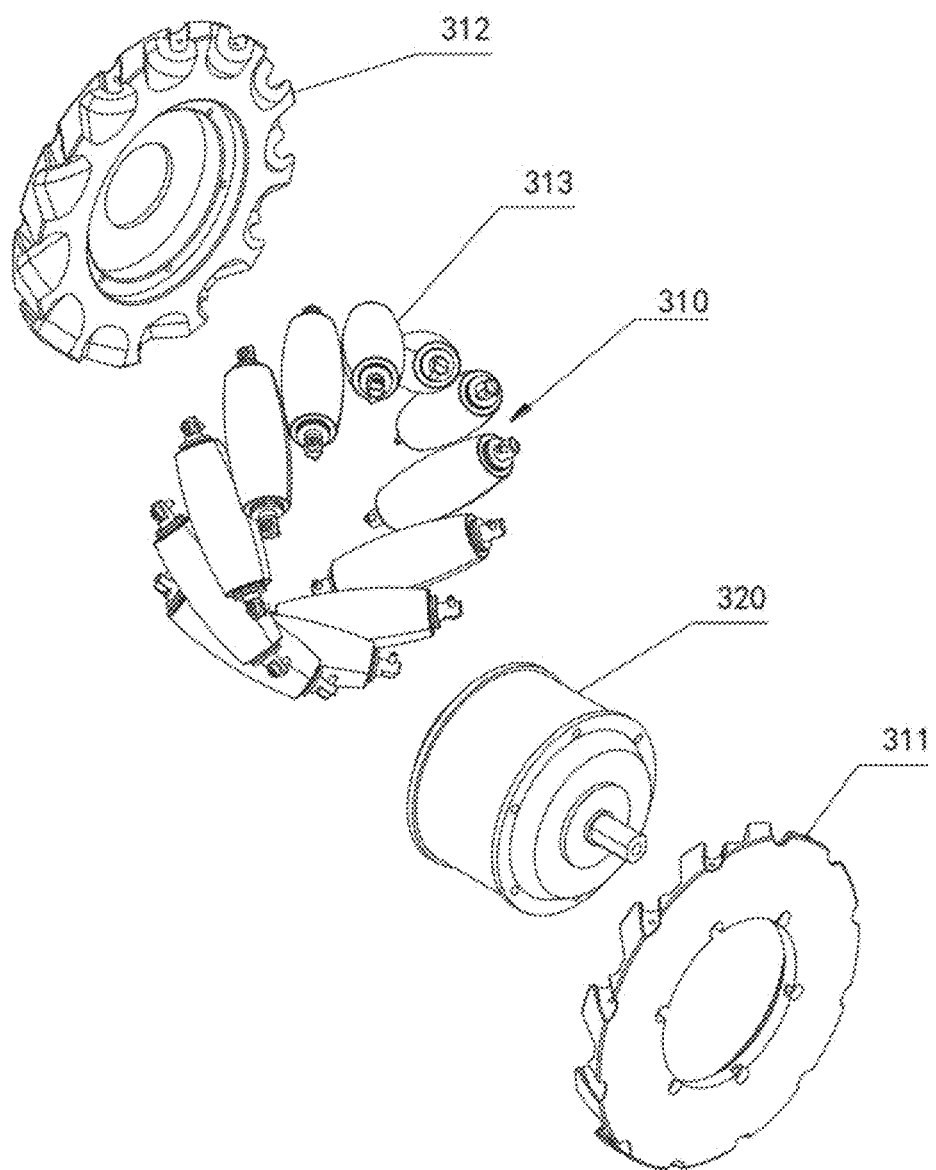
FIG. 1F is an exploded view of the mecanum wheel as shown in FIG. 1D.

Referring to FIG. 1A to FIG. 1C, the present embodiment provides a mecanum wheel. FIG. 1A and FIG. 1B are two schematic structural diagrams of the mecanum wheel provided by the present embodiment. FIG. 1C is an exploded view of the mecanum wheel as shown in FIG. 1B. Referring to FIG. 1D to FIG. 1F, FIG. 1D is a third schematic structural diagram of the mecanum wheel provided by the present embodiment. FIG. 1E is an enlarged view of a region A of the mecanum wheel as shown in FIG. 1D. FIG. 1F is an exploded view of the mecanum wheel as shown in FIG. 1D.

The mecanum wheel provided by the present embodiment is applicable to apparatuses and equipment, such as AGV (the abbreviation of Automated Guided Vehicle) transport vehicles, assistant robots, transportation platforms, and forklifts, that need to be moved in all directions, and is also applicable to the apparatuses and equipment that have compact structures, flexible movement, limited transfer space, and narrow operation channels.

Referring to FIG. 1A to FIG. 1F, the mecanum wheel includes a mecanum wheel body 310 and a drive device 320;
a wheel axle hole (not shown in the drawings) is formed in the mecanum wheel body 310; the drive device 320 is partially or completely arranged in the wheel axle hole;
the axis of a connecting shaft 321 of the drive device 320 is collinear with a rotary shaft of the mecanum wheel body 310, and the mecanum wheel body 310 rotates along with a housing of the drive device 320. Optionally, the connecting shaft 321 of the drive device 320 is configured to connect equipment, for example, to connect the base of equipment, so as to mount the mecanum wheel on the equipment. The axis of the connecting shaft 321 of the drive device 320 is collinear with the rotary shaft of the mecanum wheel body 310, so that the mecanum wheel body 310 rotates along with the housing of the drive device 320 more stably, thereby reducing the shock of the equipment using the mecanum wheel during traveling. Optionally, when the drive device 320 works, the connecting shaft 321 of the drive device 320 is relatively fixed, and the housing of the drive device 320 rotates around the connecting shaft 321 of the drive device 320, so as to make the mecanum wheel body 310 rotate along with the housing of the drive device 320.

The mecanum wheel in the present embodiment includes the mecanum wheel body 310 and the drive device 320; the drive device 320 is partially or completely arranged in a wheel axle hole of the mecanum wheel body 310 to reduce the structural sizes of the mecanum wheel and its drive motor and form a drive device 320 and mecanum wheel body 310 integrated mecanum wheel, thereby making the structure of the equipment, such as an assistant robot, using the mecanum wheel more compact.

In addition, the mecanum wheel in the present embodiment integrates the existing mecanum wheel and drive device, which reduces mounting components and parts for the mecanum wheel and the drive device, and simplifies the structure of the equipment, such as the assistant robot, using the mecanum wheel to a certain extent. The mounting process and requirements of the equipment, such as an assistant robot, using the mecanum wheel are also simplified to a certain extent, the structural weight and the manufacturing maintenance cost thereof are reduced, and the traveling reliability of the equipment may also be improved to a certain extent.

In an optional solution the present embodiment, the mecanum wheel body 310 consists of a mecanum roller bracket and mecanum rollers; the mecanum rollers are arranged on the mecanum roller bracket; the mecanum roller bracket is connected to a housing of the drive device 320. Two ends of the mecanum roller are connected to the mecanum roller bracket, or the middle of the mecanum roller is connected to the mecanum roller bracket.

Referring to FIG. 1A to FIG. 1F, optionally, the mecanum wheel body 310 includes a first end cover 311, a second end cover 312, and a plurality of mecanum rollers 313; the plurality of the mecanum rollers 313 are connected between the first end cover 311 and the second end cover 312; the plurality of the mecanum rollers 313 form a wheel axle hole;
a connecting shaft 321 of the drive device 320 extends out from the first end cover 311; the first end cover 311 may rotate relative to the connecting shaft 321 of the drive device 320.

Optionally, the connecting shaft 321 of the drive device 320 is connected to a flange plate 330, so that the connecting shaft 321 of the drive device 320 is connected to the equipment through the flange plate 330.

Referring to FIG. 1A to FIG. 1F, optionally, end cover hole slots 314 with the number corresponding to that of the mecanum rollers 313 are formed in the first end cover 311 and/or the second end cover 312; that it to say, the end cover hole slots 314 with the number corresponding to that of the mecanum rollers 313 are formed in the first end cover 311, or the end cover hole slots 314 with the number corresponding to that of the mecanum rollers 313 are formed in the second end cover 312, or the end cover hole slots 314 with the number 25 corresponding to that of the mecanum rollers 313 are formed in the first end cover 311 and the second end cover 312.

A roller shaft of the mecanum roller 313 is in fit connection with the end cover hole slot 314; optionally, the end cover hole slot 314 extends in the axial direction of the mecanum roller 313, so that the roller shaft of the mecanum roller 313 is plugged in the end cover hole slot 314, and the mecanum roller 313 is more easily in fit connection with the first end cover 311 or the second end cover 312.

In the radial direction of the first end cover 311 or the second end cover 312, the end cover hole slots 314 are opened in the edge of the first end cover 311 or the second end cover 312 and form edge notches, so that the roller shafts of the mecanum rollers 313 may enter the end cover hole slots 314 from the edge notches. The roller shaft of the mecanum roller 313 may enter the end cover hole slot 314 from the edge notch, so that the convenience in assembling the mecanum roller 313 and the first end cover 311 or the second end cover 312 is improved, thereby improving the convenience in assembling the mecanum wheel. In the case of a failure of a part number of the mecanum rollers, the part number of the mecanum rollers may be replaced or maintained conveniently and quickly, which improves the convenience in maintenance of the mecanum wheel.

Compared with the existing mecanum wheel, when a part number of the mecanum rollers are replaced or maintained, the first end cover or the second end cover and a total number of the mecanum rollers need to be detached. With respect to the mecanum wheel, only failed mecanum rollers need to be replaced, so the convenience in maintenance is greatly improved.

Referring to FIG. 1D to FIG. 1F, optionally, in the radial direction of the mecanum roller 313, the size of the edge notch is greater than or equal to the maximum size of the roller shaft of the mecanum roller 313, so that the roller shaft of the mecanum roller 313 is more easily in fit connection with the first end cover 311 or the second end cover 312, and the mecanum roller 313 is more easily in fit connection with the first end cover 311 or the second end cover 312.

Optionally, in the radial direction of the mecanum roller 313, the cross section of the end cover hole slot 314 is a triangle, a rectangle, a semicircle, or other shapes.

The cross section, fitting the end cover hole slot 314, of the roller shaft of the mecanum roller 313 is in a shape corresponding to that of the cross section of the end cover hole slot 314.

Optionally, in the radial direction of the mecanum roller 313, the roller shaft of the mecanum roller 313 is provided with a roller shaft assembling platform 3131;

the roller shaft assembling platform 3131 is provided with a screw that is in threaded connection with the first end cover 311 or the second end cover 312. The roller shaft assembling platform 3131 facilitates the assembling of the first end cover 311 or the second end cover 312 and the roller shaft of the mecanum roller 313, and then facilitates the assembling of the first end cover 311 or the second end cover 312 and the mecanum roller 313. The roller shaft assembling platform 3131 may be a part of the shape of the roller shaft itself of the mecanum roller 313, for example, the roller shaft assembling platform 3131 is one of the surfaces of the end cover hole slot 314 with a triangular or rectangular cross section. The roller shaft assembling platform 3131 may also be a platform formed by cutting the roller shaft of the mecanum roller 313.

Optionally, the housing of the drive device 320 is detachably connected to the first end cover 311, so that the first end cover 311 rotates along with the housing of the drive device 320, that is, the mecanum wheel body 310 rotates along with the housing of the drive device 320.

Optionally, the housing of the drive device 320 is detachably connected to the second end cover 312, and both the first end cover 311 and the second end cover 312 are fixedly connected to the housing of the drive device 320, so that the mecanum wheel body 310 is connected to the housing of the drive device 320 more firmly.

Optionally, the housing of the drive device 320 is detachably connected to the first end cover 311 by screws. Optionally, the number of the screws between the housing of the drive device 320 and the first end cover 311 is four, six, eight, nine, or the like. Optionally, the housing of the drive device 320 is detachably connected to the second end cover 312 by screws. Optionally, the number of the screws between the housing of the drive device 320 and the second end cover 312 is four, six, eight, nine, or the like.

In an optional solution of the present embodiment, the first end cover 311 is provided with a first end cover fitting groove; the housing of the drive device 320 is provided with a first drive fitting structure corresponding to the first end cover fitting groove; the first end cover fitting groove extends in the axial direction 322 of the connecting shaft 321 of the drive device 320; the first end cover fitting groove is in fit connection with the first drive fitting structure, so the first end cover 311 is more firmly connected to the housing of the drive device 320 to transfer a steering force of the housing of the drive device 320 to the first end cover 311 better, thereby making the mecanum wheel body 310 rotate along with the housing of the drive device 320, and also reducing the shearing force born by the screws between the first end cover 311 and the housing of the drive device 320 when the first end cover 311 rotates along with the housing of the drive device 320 to a certain extent. The first drive fitting structure, for example, may be a fitting bump, corresponding to the first end cover fitting groove, formed on the housing of the drive device 320, or may also be that the housing of the drive device 320 is in a shape corresponding to the first end cover fitting groove. For example, the cross section of the first end cover fitting groove is a rectangle, and the cross section, fitting the first end cover fitting groove, of the housing of the drive device 320 is also a rectangle. For another example, the cross section of the first end cover fitting groove is a regular polygon, and the cross section, fitting the first end cover fitting groove, of the housing of the drive device 320 is also a regular polygon.

In an optional solution of the present embodiment, the first end cover 311 is provided with a first end cover fitting bump. The housing of the drive device 320 is provided with a first drive fitting groove corresponding to the first end cover fitting bump. The first end cover fitting bump extends in the axial direction 322 of the connecting shaft 321 of the drive device 320. The first end cover fitting bump is in fit connection with the first drive fitting groove, so the first end cover 311 is more firmly connected to the housing of the drive device 320 to transfer a steering force of the housing of the drive device 320 to the first end cover 311 better, thereby making the mecanum wheel body 310 rotate along with the housing of the drive device 320, and also reducing the shearing force born by the screws between the first end cover 311 and the housing of the drive device 320 when the first end cover 311 rotates along with the housing of the drive device 320 to a certain extent.

In an optional solution of the present embodiment, the second end cover 312 is provided with a second end cover fitting groove. The housing of the drive device 320 is provided with a second drive fitting structure corresponding to the second end cover fitting groove. The second end cover fitting groove extends in the axial direction 322 of the connecting shaft 321 of the drive device 320. The second end cover fitting groove is in fit connection with the second drive fitting structure, so the second end cover 312 is more firmly connected to the housing of the drive device 320 to transfer a steering force of the housing of the drive device 320 to the second end cover 312 better, thereby making the mecanum wheel body 310 rotate along with the housing of the drive device 320, and also reducing the shearing force born by the screws between the second end cover 312 and the housing of the drive device 320 when the second end cover 312 rotates along with the housing of the drive device 320 to a certain extent. The second drive fitting structure, for example, may be a fitting bump, corresponding to the second end cover fitting groove, formed on the housing of the drive device 320, or may also be that the housing of the drive device 320 is in a shape corresponding to the second end cover fitting groove. For example, the cross section of the second end cover fitting groove is a rectangle, and the cross section, fitting the second end cover fitting groove, of the housing of the drive device 320 is also a rectangle. For another example, the cross section of the second end cover fitting groove is a regular polygon, and the cross section, fitting the second end cover fitting groove, of the housing of the drive device 320 is also a regular polygon.

In an optional solution of the present embodiment, the second end cover 312 is provided with a second end cover fitting bump. The housing of the drive device 320 is provided with a second drive fitting groove corresponding to the second end cover fitting bump. The second end cover fitting bump extends in the axial direction 322 of the connecting shaft 321 of the drive device 320. The second end cover fitting bump is in fit connection with the second drive fitting groove, so the second end cover 312 is more firmly connected to the housing of the drive device 320 to transfer a steering force of the housing of the drive device 320 to the second end cover 312 better, thereby making the mecanum wheel body 310 rotate along with the housing of the drive device 320, and also reducing the shearing force born by the screws between the second end cover 312 and the housing of the drive device 320 when the second end cover 312 rotates along with the housing of the drive device 320 to a certain extent.

In the mecanum wheel of the present embodiment, through fitting structures arranged between the first end cover 311 and the housing of the drive device 320 and between the second end cover 312 and the housing of the drive device 320, the mecanum wheel body 310 is more firmly connected to the housing of the drive device 320 to transfer a steering force of the housing of the drive device 320 to the mecanum wheel body 310 better. Meanwhile, the shearing force born by the connecting screws between the mecanum wheel body 310 and the housing of the drive device 320 when the mecanum wheel body 310 rotates along with the housing of the drive device 320 is also reduced to a certain extent.

In an optional solution of the present embodiment, the drive device 320 includes a hub motor. The connecting shaft 321 of the drive device 320 is a connecting shaft of the hub motor. The hub motor is arranged in a wheel axle hole. The mecanum wheel body 310 rotates around the connecting shaft of the hub motor along with a housing of the hub motor. The connecting shaft of the hub motor is connected to equipment, for example, connected to a base of equipment, so that the mecanum wheel body 310 rotates around the housing of the hub motor.

In an optional solution of the present embodiment, the drive device 320 includes a hub motor and a speed reducer. The hub motor is connected to the speed reducer and drives the speed reducer. The connecting shaft 321 of the drive device 320 is a connecting shaft of the hub motor. The hub motor is arranged in the wheel axle hole. The speed reducer is partially or completely arranged in the wheel axle hole. The mecanum wheel body 310 rotates around the connecting shaft of the speed reducer along with a housing of the hub motor. The connecting shaft of the hub motor is connected to equipment, for example, connected to a base of equipment, so that the mecanum wheel body 310 rotates along with the housing of the hub motor.

In an optional solution of the present embodiment, the hub motor includes an inner stator connecting shaft and an outer rotor housing;
in the axial direction of the inner stator connecting shaft, the first end cover 311 and/or the second end cover 312 are respectively connected to two ends of the outer rotor housing by screws;
the inner stator connecting shaft extends out of the first end cover 311, and the axis of the inner stator connecting shaft is collinear with the rotary shaft of the mecanum wheel body 310;
when the hub motor works, the first end cover 311 and the second end cover 312 rotate along with the outer rotor housing. Optionally, when the hub motor works, the first end cover 311 and the second end cover 312 rotate around the inner stator connecting shaft along with the outer rotor housing.

The present embodiment provides a shock absorbing device.

Figure 2A:
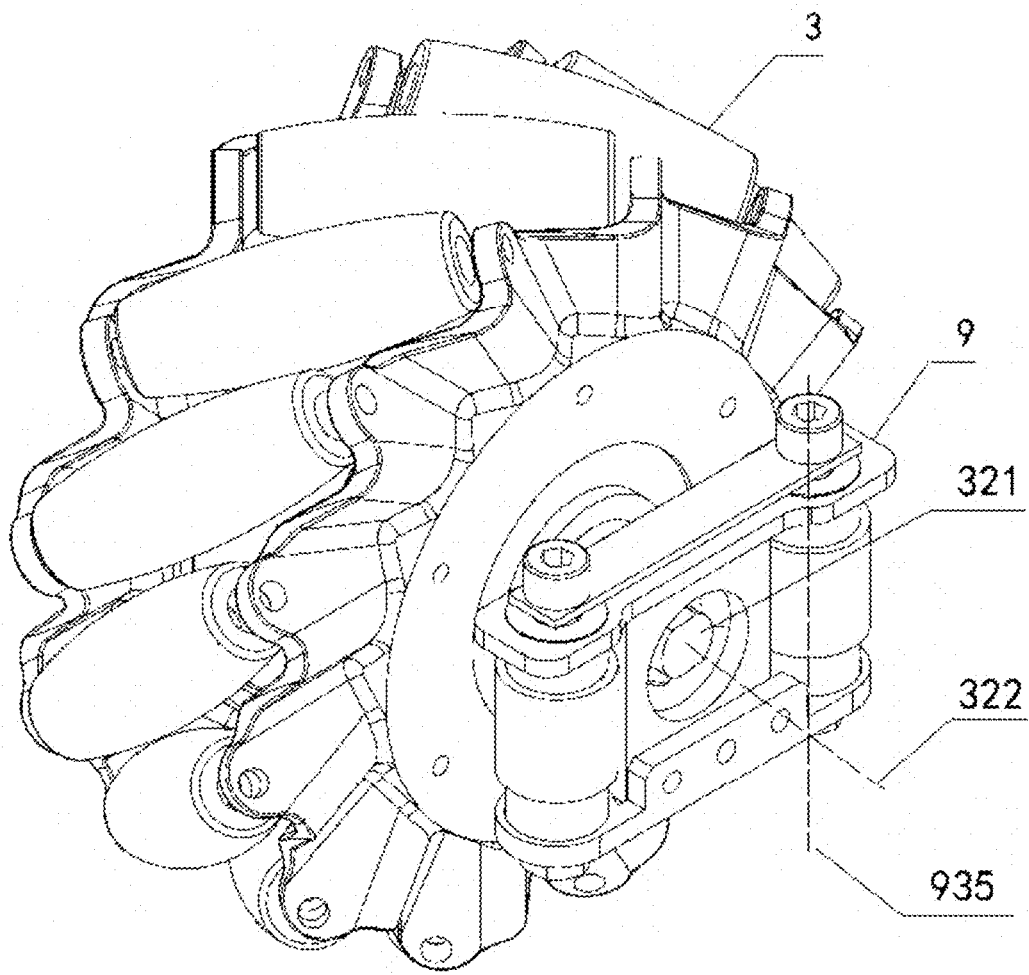
FIG. 2A is a schematic structural diagram of a mecanum wheel with a shock absorbing device provided by the embodiments of the present disclosure.
Figure 2B:
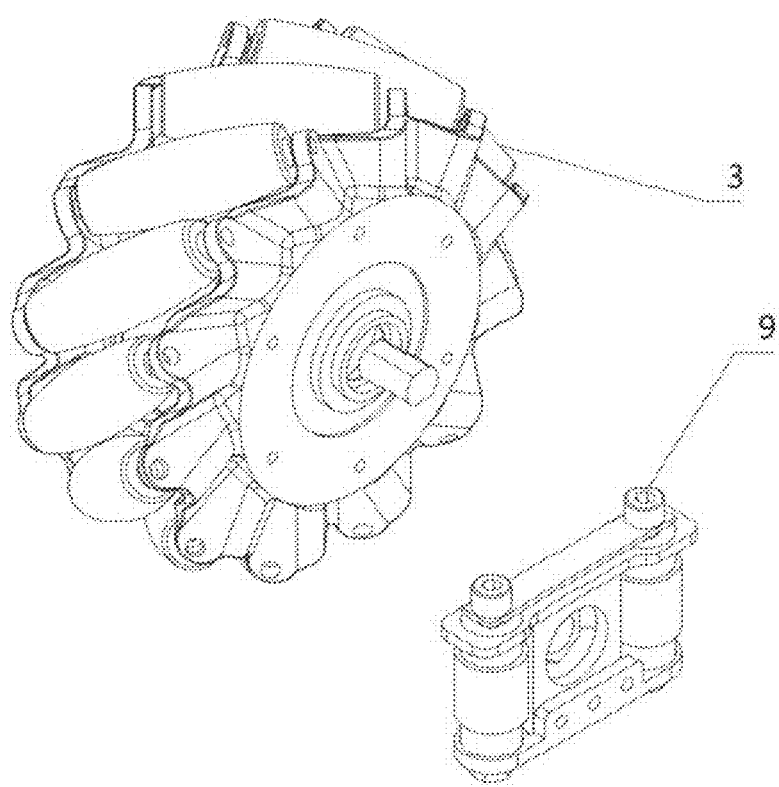
FIG. 2B is an exploded view of the mecanum wheel with a shock absorbing device as shown in FIG. 2A.
Figure 2C:
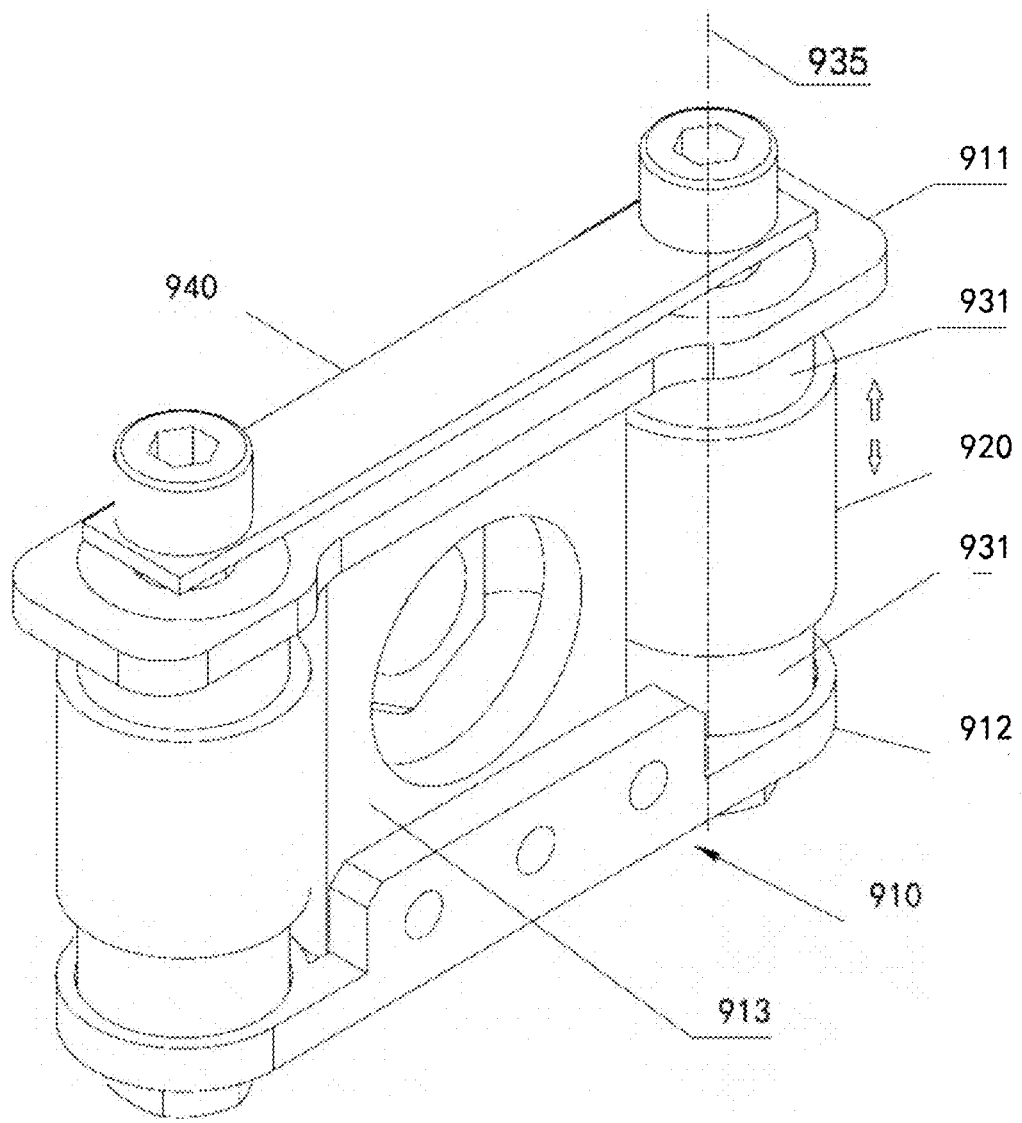
FIG. 2C is a schematic structural diagram of a shock absorbing device provided by the embodiments of the present disclosure.
Figure 2D:
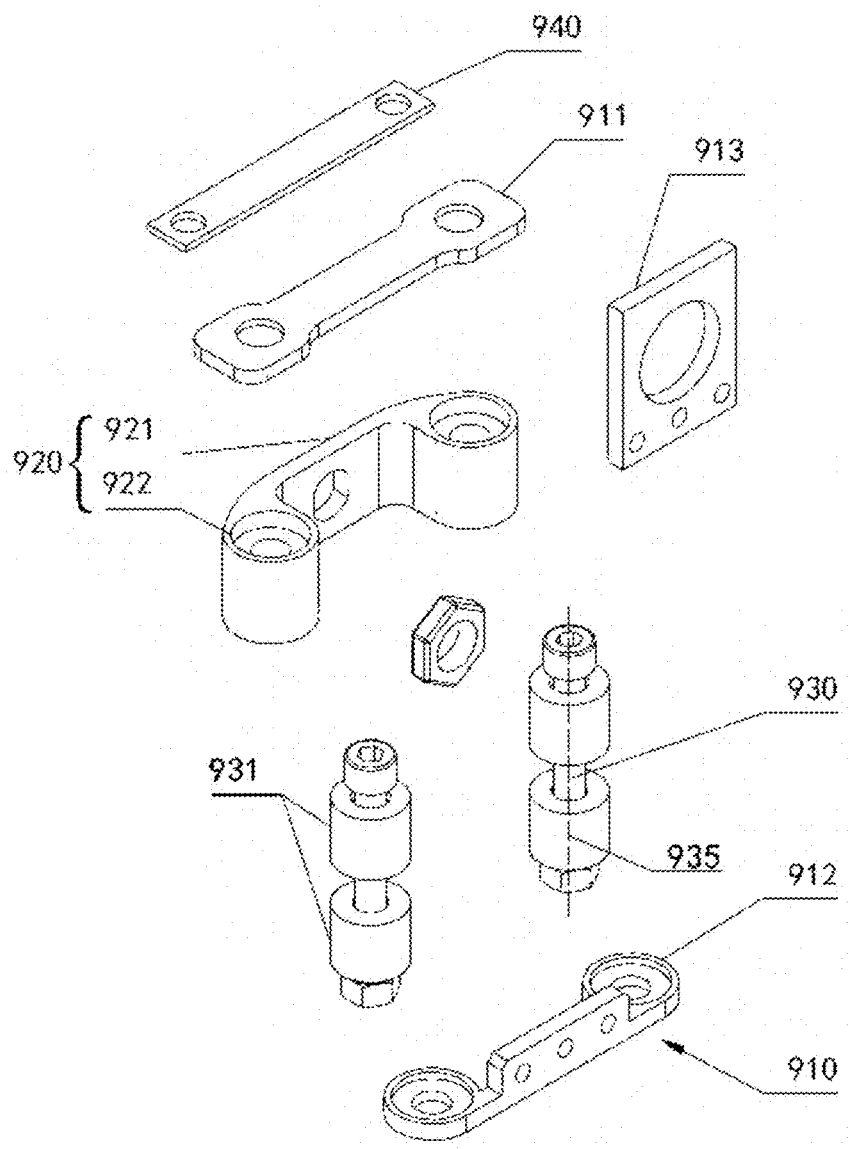
FIG. 2D is an exploded view of the shock absorbing device as shown in FIG. 2C.
Figure 2E:
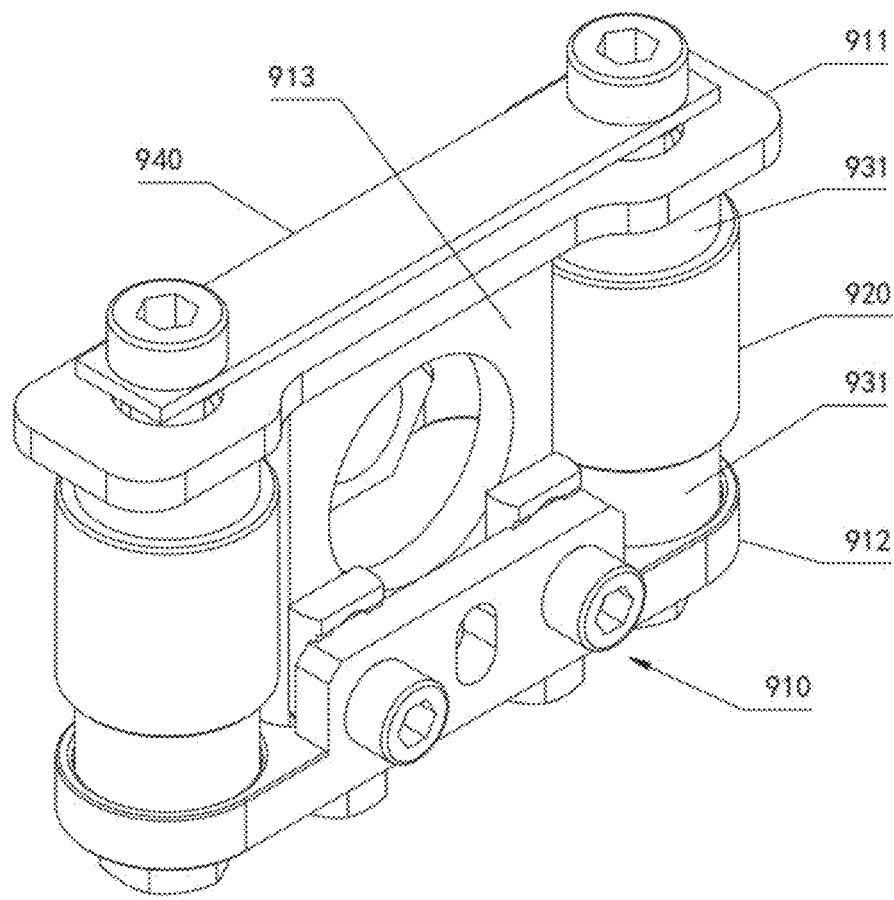
FIG. 2E is an another schematic structural diagram of the shock absorbing device provided by the embodiments of the present disclosure.
Figure 2F:
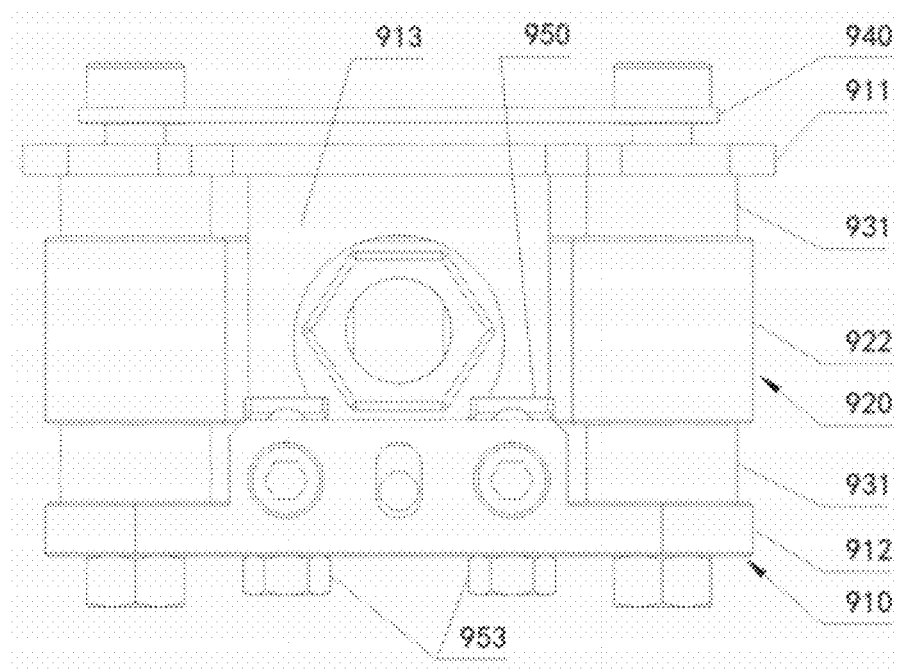
FIG. 2F is a main view of the shock absorbing device as shown in FIG. 2E.
Figure 2G:
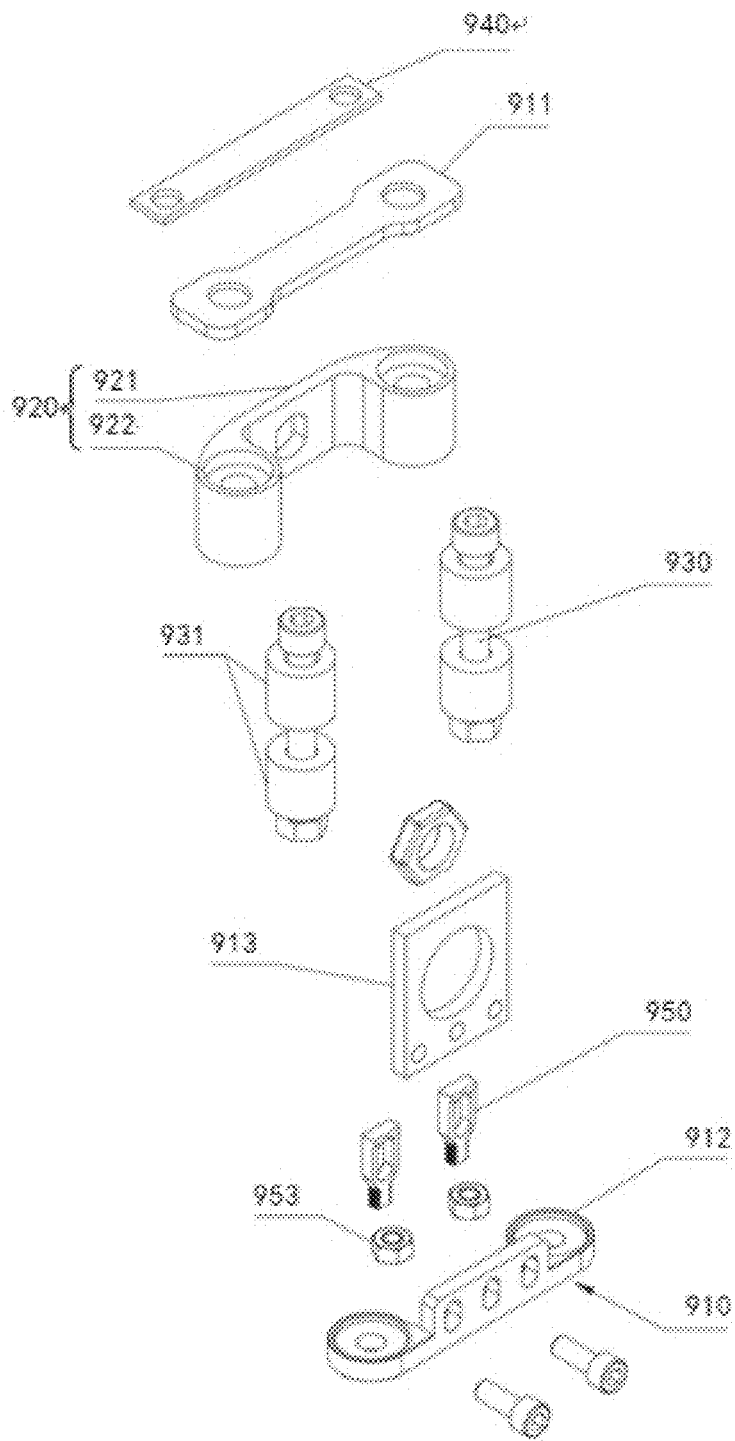
FIG. 2G is an exploded view of the shock absorbing device as shown in FIG. 2E.
Figure 2H:
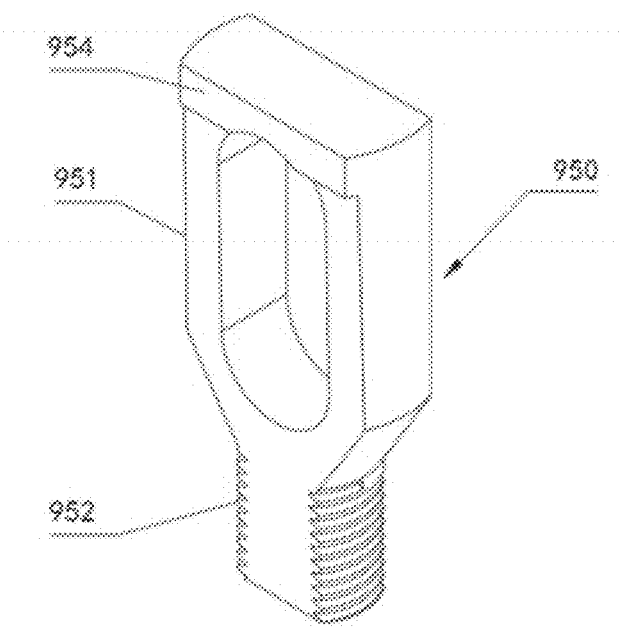
FIG. 2H is a schematic structural diagram of a shock absorbing adjusting piece provided by the embodiments of the present disclosure.
Figure 2I:
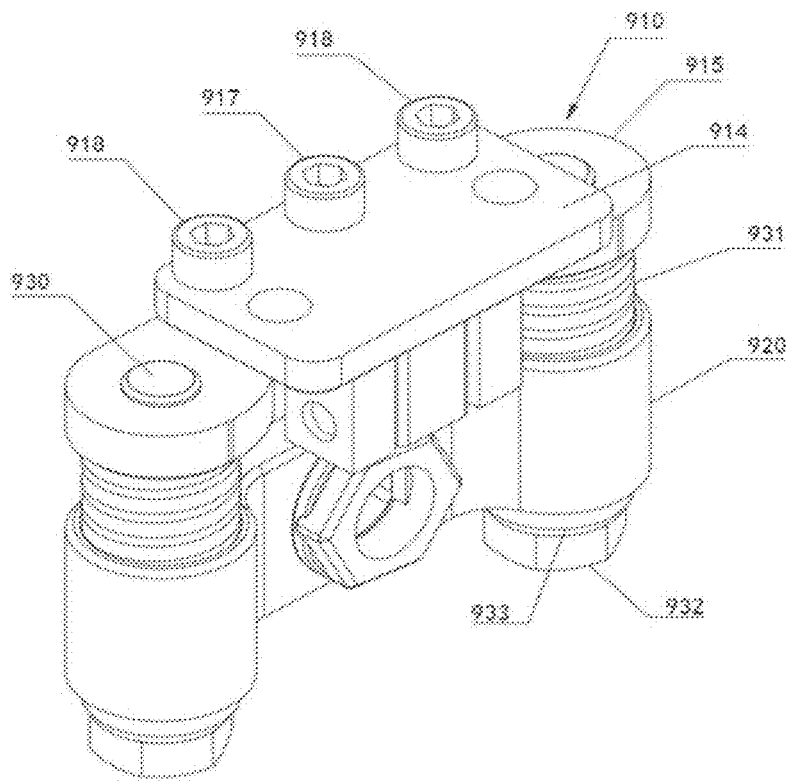
FIG. 2I is a yet another schematic structural diagram of the shock absorbing device provided by the embodiments of the present disclosure.
Figure 2J:
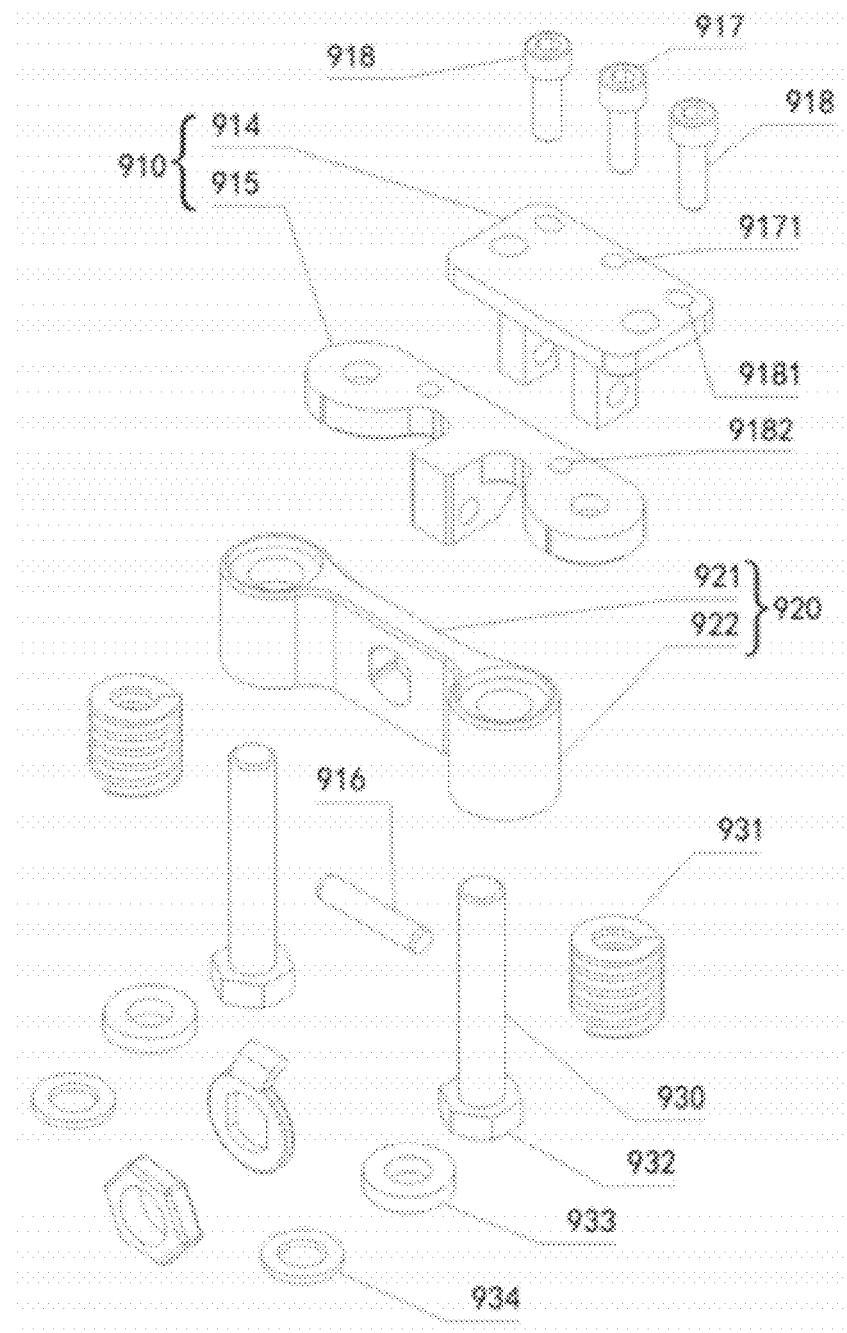
FIG. 2J is an exploded view of the shock absorbing device as shown in FIG. 2I.

Referring to FIG. 2C to FIG. 2H, FIG. 2C and FIG. 2E are two schematic structural diagrams of the shock absorbing device provided by the present embodiment. FIG. 2D is an exploded view of the shock absorbing device as shown in FIG. 2C. FIG. 2F is a main view of the shock absorbing device as shown in FIG. 2E. FIG. 2G is an exploded view of the shock absorbing device as shown in FIG. 2E. FIG. 2H is a schematic structural diagram of a shock absorbing adjusting piece provided by the present embodiment. FIG. 2I is a third schematic structural diagram of the shock absorbing device provided by the present embodiment. FIG. 2J is an exploded view of the shock absorbing device as shown in FIG. 2I.

Referring to FIG. 2C to FIG. 2H, the shock absorbing device provided by the present embodiment includes a shock absorbing fixed bracket 910 and a shock absorbing moving bracket 920; the shock absorbing fixed bracket 910 is fixedly connected to a connecting shaft of a wheel;
the shock absorbing fixed bracket 910 includes at least one shock absorbing fixed shaft 930; the shock absorbing moving bracket 920 is arranged outside the shock absorbing fixed shaft 930 in a sleeving manner and may move reciprocally in the longitudinal direction 935 of the shock absorbing fixed shaft 930, so that the wheel may move reciprocally in the longitudinal direction 935 of the shock absorbing fixed shaft 930 along with the shock absorbing moving bracket 920. Optionally, the number of the shock absorbing fixed shafts 930 is one, two, four, five, or the like. Optionally, the shock absorbing fixed shafts 930 are arranged pairwise.

Two elastic elements 931 are arranged outside the shock absorbing fixed shaft 930 in a sleeving manner. The shock absorbing moving bracket 920 is connected between the two elastic elements 931. The elastic elements 931 are in a compressed state or the elastic elements 931 are in a non-stressed state. The elastic elements 931 have the tendency to make the shock absorbing moving bracket 920 return to an original position.

The longitudinal direction 935 of the shock absorbing fixed shaft 930 and the axial direction of the connecting shaft of the wheel are arranged at an included angle. Optionally, the longitudinal direction 935 of the shock absorbing fixed shaft 930 and the axial direction of the connecting shaft of the wheel are arranged at a right angle or an approximate right angle. Therefore, the two elastic elements 931 on the shock absorbing fixed shaft 930 can well reduce the shock on the equipment, such as an assistant robot and a traveling apparatus, when the 30 wheel travels.

According to the shock absorbing device of the present embodiment, the shock generated when the wheel travels may be absorbed by the elastic elements 931 through the shock absorbing fixed bracket 910, the shock absorbing moving bracket 920, and the elastic elements 931. The shock absorbing device 9 is simple and compact in structure and relatively low in cost, facilitates production and processing, can well reduce the shock on the equipment, such as an assistant robot, when the wheel travels, and can also make the structures of the equipment, such as an assistant robot and a traveling apparatus, more compact.

Referring to FIGS. 2C and 2D, in an optional solution of the present embodiment, the shock absorbing fixed bracket 910 includes a first shock absorbing fixed part 911, a second shock absorbing fixed part 912, and a third shock absorbing fixed part 913. Optionally, the first shock absorbing fixed part 911 includes two first shock absorbing fixed subparts, and corresponding connecting parts of the equipment are clamped by the two first shock absorbing fixed subparts, so as to improve the connection firmness of the shock absorbing device and the equipment.

The first shock absorbing fixed part 911 is fixedly connected to the second first shock absorbing fixed part 912 through the shock absorbing fixed shaft 930; the first shock absorbing fixed part 911 is configured to be fixedly connected to the equipment, such as an assistant robot and a traveling apparatus.

The third shock absorbing fixed part 913 is fixedly connected to the first shock absorbing fixed part 911 and the second shock absorbing fixed part 912. The structure of the shock absorbing fixed bracket 910 is strengthened by the first shock absorbing fixed part 911, the second shock absorbing fixed part 912, and the third shock absorbing fixed part 913. A supporting force of the wheel is transferred to the shock absorbing device 9 through the shock absorbing fixed shaft 930, and then is transferred to supporting equipment. Through the fit of the third shock absorbing fixed part 913 and the shock absorbing fixed shaft 930, the supporting bearing capacity of the shock absorbing device 9 is improved, the service life of the shock absorbing fixed shaft 930 is prolonged, and the service life of the shock absorbing device 9 is also prolonged.

In an optional solution of the present embodiment, the shock absorbing moving bracket 920 includes a shock absorbing moving bracket connecting part 921 and at least two shock absorbing moving bracket sleeving parts 922; a connecting shaft of a wheel penetrates through the shock absorbing moving bracket connecting part 921 and is fixedly connected to the shock absorbing moving bracket connecting part 921; optionally, the connecting shaft of the wheel is fixedly connected to the shock absorbing moving bracket 920 by nuts.

The shock absorbing moving bracket sleeving parts 922 are arranged outside the shock absorbing fixed shaft 930 in a sleeving manner; the number of the shock absorbing moving bracket sleeving parts 922 is corresponding to that of the shock absorbing fixed shafts 930; that is to say, the number of the shock absorbing moving bracket sleeving parts 922 is the same as that of the shock absorbing fixed shafts 930.

Adjacent shock absorbing moving bracket sleeving parts 922 are fixedly connected through the shock absorbing moving bracket connecting part 921;
the shock absorbing moving bracket connecting part 921 is protruded from a surface formed by the adjacent shock absorbing moving bracket sleeving parts 922, so the shock absorbing moving bracket 920 forms an arc-shaped or an arc-like structure, so as to improve the elastic deformation capacity of the shock absorbing moving bracket 920 to better transfer the supporting force of the wheel to traveling equipment through the shock absorbing device 9.

Optionally, the number of the shock absorbing fixed shafts 930 is two; the number of the shock absorbing moving bracket sleeving parts 922 is also two.

Optionally, the shock absorbing moving bracket 920 is of a symmetrical structure. Optionally, the connecting shaft of the wheel penetrates through the center of the shock absorbing moving bracket 920 and is fixedly connected to the shock absorbing moving bracket connecting part 921.

Optionally, the shock absorbing moving bracket connecting part 921 is parallel or approximately parallel to the third shock absorbing fixed part 913. Optionally, a third shock absorbing fixing through hole corresponding to the position of the connecting shaft of the wheel is formed in the third shock absorbing fixed part 913. The hole diameter of the third shock absorbing fixing through hole is greater than the shaft diameter of the connecting shaft of the wheel, which facilitates the connection between the wheel and the shock absorbing moving bracket connecting part 921.

In an optional solution of the present embodiment, the elastic element 931 includes a spring, a polyurethane structural part, a rubber loop, a silicone loop, or other elastic elements. The polyurethane structural part may be a polyurethane loop, a polyurethane ring, a polyurethane block, or the like.

Referring to FIGS. 2E and 2H, in an optional solution of the present embodiment, the second shock absorbing fixed part 912 is detachably and fixedly connected to the third shock absorbing fixed part 913, and at least one shock absorbing adjusting piece 950 is arranged between the second shock absorbing fixed part 912 and the third shock absorbing fixed part 913. Optionally, the number of the shock absorbing adjusting piece 950 arranged between the second shock absorbing fixed part 912 and the third shock absorbing fixed part 913 is one or more, for example, one, two, three, five, or the like.

The shock absorbing adjusting piece 950 includes a wedge-shaped structure. Optionally, in the extension direction of the shock absorbing adjusting piece 950, the surface, connected to the second shock absorbing fixed part 912, of the shock absorbing adjusting piece 950 is a wedge-shaped surface, and/or, in the extension direction of the shock absorbing adjusting piece 950, the surface, connected to the third shock absorbing fixed part 913, of the shock absorbing adjusting piece 950 is a wedge-shaped surface. The wedge-shape surface is an inclined surface of the wedge-shaped structure, and it may also be interpreted as that the wedge-shaped surface is an inclined surface, with an acute angle or an obtuse angle in the extension direction of the wedge-shaped structure, of the wedge-shaped structure.

In the longitudinal direction 935 of the shock absorbing fixed shaft, the shock absorbing adjusting piece 950 may be moved to change the distance between the second shock absorbing fixed part 912 and the third shock absorbing fixed part 913, so as to adjust the angle between the shock absorbing moving bracket 920 that is arranged outside the shock absorbing fixed shaft 930 in a sleeving manner and the third shock absorbing fixed part 913, and then adjust the angle between the connecting shaft of the wheel and the third shock absorbing fixed part 913, that is, adjust the perpendicularity of the wheel, thereby reducing the shock of the wheel during traveling, and reducing the shock of the equipment using the wheel. In addition, the service life of the wheel may also be prolonged.

Referring to FIG. 2H, in an optional solution of the present embodiment, the shock absorbing adjusting piece 950 includes an adjusting fitting part 951 and an adjusting threaded part 952 that is fixedly connected to the adjusting fitting part 951; the adjusting fitting part 951 is of a wedge-shaped structure. Optionally, in the extension direction of the shock absorbing adjusting piece 950, the surface, connected to second shock absorbing fixed part 912, of the adjusting fitting part 951 is a wedge-shaped surface, and/or, in the extension direction of the shock absorbing adjusting piece 950, the surface, connected to the third shock absorbing fixed part 913, of the adjusting fitting part 951 is a wedge-shaped surface. Optionally, in the extension direction of the shock absorbing adjusting piece 950, the surface, connected to second shock absorbing fixed part 912, of the adjusting fitting part 951 is a wedge-shaped surface. The surface, connected to the third shock absorbing fixed part 913, of the adjusting fitting part 951 is parallel to the extension direction of the shock absorbing adjusting piece 950.

The adjusting fitting part 951 is arranged between the second shock absorbing fixed part 912 and the third shock absorbing fixed part 913;
optionally, the adjusting threaded part 952 is in threaded connection with an adjusting nut 953; the adjusting nut 953 is pressed against one surface, far away from the shock absorbing moving bracket, the second shock absorbing fixed part 912; when the adjusting nut 953 is rotated, the shock absorbing adjusting piece 950 may be moved to change the distance between the second shock absorbing fixed part 912 and the third shock absorbing fixed part 913. The adjusting nut 953 fits the shock absorbing moving bracket 952 to finely adjust the angle between the shock absorbing moving bracket 920 that is arranged outside the shock absorbing fixed shaft 930 in a sleeving manner and the third shock absorbing fixed part 913, and then finely adjust the angle between the connecting shaft of the wheel and the third shock absorbing fixed part 913, that is, finely adjust the perpendicularity of the wheel, thereby reducing the shock of the wheel during traveling.

Referring to FIG. 2H, in an optional solution of the present embodiment, an adjusting through hole (not shown in the drawings) is formed in the adjusting fitting part 951. A screw for connecting the second shock absorbing fixed part 912 and the third shock absorbing fixed part 913 is plugged in the adjusting through hole. Optionally, the adjusting through hole is a slotted hole, so as to facilitate the movement of the screw in the adjusting through hole. Optionally, when there are a plurality of the shock absorbing adjusting pieces 950, there are a plurality of screws for connecting the second shock absorbing fixed part 912 and the third shock absorbing fixed part 913. The screws for connecting the second shock absorbing fixed part 912 and the third shock absorbing fixed part 913 are in one-to-one correspondence with the shock absorbing adjusting pieces 950.

Referring to FIG. 2H, in an optional solution of the present embodiment, an adjusting fitting protrusion part 954 is formed at one end, far away from the adjusting threaded part 952, of the adjusting fitting part 951;

the adjusting fitting protrusion part 954 is protruded from the wedge-shaped surface of the adjusting fitting part 951;

the wedge-shaped surface of the adjusting fitting part 951 is connected to the second shock absorbing fixed part 912. The adjusting fitting protrusion part 954 is adjusted to ensure that the shock absorbing adjusting piece 950 is located between the second shock absorbing fixed part 912 and the third shock absorbing fixed part 913 to prevent the shock absorbing adjusting piece 950 from falling off.

Referring to FIG. 2C to 2G, in an optional solution of the present embodiment, the shock absorbing fixed bracket 910 includes a shock absorbing mounting piece 940;

the shock absorbing mounting piece 940, the first shock absorbing fixed part 911, and the second shock absorbing fixed part 912 are arranged on the shock absorbing fixed shaft at intervals in sequence.

equipment is fixedly connected between the shock absorbing mounting piece 940 and the first shock absorbing fixed part 911. Corresponding connecting parts of the equipment are clamped by the shock absorbing mounting piece 940 and the first shock absorbing fixed part 911, so as to improve the connection firmness of the shock absorbing device and the equipment.

A wheel structure with a shock absorbing device provided by the present embodiment includes a wheel and the shock absorbing device; the wheel is connected to the shock absorbing device.

Optionally, the number of the shock absorbing device is one; the shock absorbing device is arranged on one side of the wheel, and the shock absorbing moving bracket of the shock absorbing device is fixedly connected a connecting shaft of the wheel;

or, the number of the shock absorbing devices is two. The wheel is arranged between the two shock absorbing devices, and the shock absorbing moving brackets of both shock absorbing devices are fixedly connected to a connecting shaft of the wheel. That is to say, the connecting shaft of the wheel penetrates through the wheel, so that two ends of the connecting shaft of the wheel are respectively connected to the shock absorbing devices 9. The shock absorbing devices are respectively arranged on the two sides of the wheel to improve the shock reducing performance of the wheel, so as to further reduce the shock of the traveling equipment mounted with the wheel.

Optionally, the wheel is the mecanum wheel.

The present embodiment provides a mecanum wheel with a shock absorbing device. The mecanum wheel with a shock absorbing device includes the mecanum wheel. The technical features of the mecanum wheel disclosed above are also suitable for the mecanum wheel with a shock absorbing device.

Referring to FIG. 2A to 2H, FIG. 2A is a schematic structural diagram of a mecanum wheel with a shock absorbing device provided by the present embodiment. FIG. 2B is an exploded view of the mecanum wheel with a shock absorbing device as shown in FIG. 2A. FIG. 2C is a schematic structural diagram of a shock absorbing device provided by the present embodiment. FIG. 2D is an exploded view of the shock absorbing device as shown in FIG. 2C. FIG. 2E is another schematic structural diagram of the shock absorbing device provided by the present embodiment. FIG. 2G is a main view of the shock absorbing device as shown in FIG. 2E. FIG. 2H is an exploded view of the shock absorbing device as shown in the FIG. 2E. FIG. 2I is a schematic structural diagram of a shock absorbing adjusting piece provided by the present embodiment. FIG. 2J is a third schematic structural diagram of the shock absorbing device provided by the present embodiment. FIG. 2K is an exploded view of the shock absorbing device as shown in FIG. 2J.

Referring to FIG. 2A to FIG. 2K, the mecanum wheel with a shock absorbing device includes a mecanum wheel body 3, and further includes a shock absorbing device 9. The mecanum wheel body 3 is connected to the shock absorbing device 9. The shock transferred to the equipment by the mecanum wheel 3 may be retarded by the shock absorbing device 9, so that the shock of the overall equipment when traveling on a road surface may be effectively retarded, thereby ensuring the stability and the horizontality of the equipment in a moving process.

In an optional solution of the present embodiment, the number of the shock absorbing device may be one or more.

For example, the number of the shock absorbing device 9 is one. The shock absorbing device 9 is arranged on one side of the mecanum wheel 3, and the shock absorbing device is fixedly connected to a connecting shaft 321 of a drive device 320 of the mecanum wheel 3, as shown in FIG. 2A to FIG. 2D.

For another example, the number of the shock absorbing device 9 is two. The mecanum wheel is arranged between the two shock absorbing devices, and both shock absorbing devices are fixedly connected to a connecting shaft 321 of a drive device 320 of the mecanum wheel 3. That is to say, the connecting shaft of the driving device of the mecanum wheel penetrates through the mecanum wheel, so that two ends of the connecting shaft 321 of the drive device 320 are respectively connected to the shock absorbing devices 9. The shock absorbing devices are respectively arranged on two sides of the mecanum wheel to improve the shock reducing performance of the mecanum wheel with a shock absorbing device, thereby further reducing the shock of the equipment, such as an assistant robot, mounted with the mecanum wheel with a shock absorbing device.

In an optional solution of the present embodiment, the shock absorbing device 9 includes a shock absorbing fixed bracket 910 and a shock absorbing moving bracket 920. The shock absorbing moving bracket 920 is fixedly connected to a connecting shaft 321 of a drive device 320 of the mecanum wheel 3;

the shock absorbing fixed bracket 910 includes at least one shock absorbing fixed shaft 930; the shock absorbing moving bracket 920 is arranged outside the shock absorbing fixed shaft 930 in a sleeving manner and may move reciprocally in the longitudinal direction 935 of the shock absorbing fixed shaft 930, so that the mecanum wheel 3 may move reciprocally in the longitudinal direction 935 of the shock absorbing fixed shaft 930 along with the shock absorbing moving bracket 920; optionally, the number of the shock absorbing fixed shaft 930 is one, two, four, five, or the like. Optionally, the shock absorbing fixed shafts 930 are arranged pairwise.

Two elastic elements 931 are arranged outside the shock absorbing fixed shaft 930 in a sleeving manner. The shock absorbing moving bracket 920 is connected between the two elastic elements 931. The elastic elements 931 are in a compressed state or the elastic elements 931 are in a non-stressed state. The elastic elements 931 have the tendency to make the shock absorbing moving bracket 920 return to an original position.

The longitudinal direction 935 of the shock absorbing fixed shaft 930 and the axial direction 322 of the connecting shaft 321 of the drive device 320 are arranged at an included angle. Optionally, the longitudinal direction 935 of the shock absorbing fixed shaft 930 and the axial direction 322 of the connecting shaft 321 of the drive device 320 are arranged at a right angle or an approximate right angle. Therefore, the two elastic elements 931 on the shock absorbing fixed shaft 930 can well reduce the shock on the equipment, such as an assistant robot, when the mecanum wheel 3 travels.

According to the mecanum wheel with a shock absorbing device of the present embodiment, the shock generated when the mecanum wheel 3 travels may be absorbed by the elastic elements 931 through the shock absorbing fixed bracket 910, the shock absorbing moving bracket 920, and the elastic elements 931. The shock absorbing device 9 is simple and compact in structure and relatively low in cost, facilitates production and processing, can reduce the shock on the equipment, such as an assistant robot, when the mecanum wheel 3 travels very well, and can also make the structures of the equipment, such as the assistant robot, more compact.

Referring to FIG. 2C and FIG. 2D, in an optional solution of the present embodiment, the shock absorbing fixed bracket 910 includes a first shock absorbing fixed part 911, a second shock absorbing fixed part 912, and a third shock absorbing fixed part 913. Optionally, the first shock absorbing fixed part 911 includes two first shock absorbing fixed subparts, and corresponding connecting parts of the equipment are clamped by the two first shock absorbing fixed subparts, so as to improve the connection firmness of the shock absorbing device and the equipment.

The first shock absorbing fixed part 911 is fixedly connected to the second first shock absorbing fixed part 912 through the shock absorbing fixed shaft 930. The first shock absorbing fixed part 911 is configured to be fixedly connected to the equipment, such as an assistant robot.

The third shock absorbing fixed part 913 fixedly connected to the first shock absorbing fixed part 911 and the second shock absorbing fixed part 912. The structure of the shock absorbing fixed bracket 910 is strengthened by the first shock absorbing fixed part 911, the second shock absorbing fixed part 912, and the third shock absorbing fixed part 913. A supporting force of the mecanum wheel 3 is transferred to the shock absorbing device 9 through the shock absorbing fixed shaft 930, and then is transferred to supporting equipment. Through the fit of the third shock absorbing fixed part 913 and the shock absorbing fixed shaft 930, the supporting bearing capacity of the shock absorbing device 9 is improved, the service life of the shock absorbing fixed shaft 930 is prolonged, and the service life of the shock absorbing device 9 is also prolonged.

In an optional solution of the present embodiment, a shock absorbing moving bracket 920 includes a shock absorbing moving bracket connecting part and at least two shock absorbing moving bracket sleeving parts 922. A connecting shaft 321 of a drive device 320 penetrates through the shock absorbing moving bracket connecting part 921 and is fixedly connected to the shock absorbing moving bracket connecting part 921. Optionally, the connecting shaft 321 of the drive device 320 is fixedly connected to the shock absorbing moving bracket 920 by nuts.

The shock absorbing moving bracket sleeving parts 922 are arranged outside the shock absorbing fixed shaft 930 in a sleeving manner. The number of the shock absorbing moving bracket sleeving parts 922 is corresponding to that of the shock absorbing fixed shafts 930. That is to say, the number of the shock absorbing moving bracket sleeving parts 922 is the same as that of the shock absorbing fixed shafts 930.

Adjacent shock absorbing moving bracket sleeving parts 922 are fixedly connected through the shock absorbing moving bracket connecting part 921;

the shock absorbing moving bracket connecting part 921 is protruded from a surface formed by the adjacent shock absorbing moving bracket sleeving parts 922, so that the shock absorbing moving bracket 920 forms an arc-shaped or an arc-like structure, thereby improving the elastic deformation capacity of the shock absorbing moving bracket 920, and better transferring the supporting force of the mecanum wheel 3 to the equipment through the shock absorbing device 9.

Optionally, the number of the shock absorbing fixed shafts 930 is two, and the number of the shock absorbing moving bracket sleeving parts 922 is also two.

Optionally, the shock absorbing moving bracket 920 is of a symmetrical structure. Optionally, the connecting shaft 321 of the drive device 320 penetrates through the center of the shock absorbing moving bracket 920 and is fixedly connected to the shock absorbing moving bracket connecting part 921.

Optionally, the shock absorbing moving bracket connecting part 921 is parallel or approximately parallel to the third shock absorbing fixed part 913. Optionally, a third shock absorbing fixing through hole corresponding to the position of the connecting shaft 321 of the drive device 320 is formed in the third shock absorbing fixed part 913. The hole diameter of the third shock absorbing fixing through hole is greater than the shaft diameter of the connecting shaft 321 of the drive device 320, which facilitates the connection between the mecanum wheel 3 and the shock absorbing moving bracket connecting part 921.

In an optional solution of the present embodiment, the elastic element 931 includes a spring, a polyurethane structural part, a rubber loop, a silicone loop, or other elastic elements. The polyurethane structural part may be a polyurethane loop, a polyurethane ring, a polyurethane block, or the like.

Referring to FIG. 2E and FIG. 2H, in an optional solution of the present embodiment, the second shock absorbing fixed part 912 is detachably and fixedly connected to the third shock absorbing fixed part 913, and at least one shock absorbing adjusting piece 950 is arranged between the second shock absorbing fixed part 912 and the third shock absorbing fixed part 913. Optionally, the number of the shock absorbing adjusting piece 950 arranged between the second shock absorbing fixed part 912 and the third shock absorbing fixed part 913 is one or more, for example, one, two, three, five, or the like.

The shock absorbing adjusting piece 950 includes a wedge-shaped structure. Optionally, in the extension direction of the shock absorbing adjusting piece 950, the surface, connected to the second shock absorbing fixed part 912, of the shock absorbing adjusting piece 950 is a wedge-shaped surface, and/or, in the extension direction of the shock absorbing adjusting piece 950, the surface, connected to the third shock absorbing fixed part 913, of the shock absorbing adjusting piece 950 is a wedge-shaped surface. The wedge-shape surface is an inclined surface of the wedge-shaped structure, and it may also be interpreted as that the wedge-shaped surface is an inclined surface, with an acute angle or an obtuse angle in the extension direction of the wedge-shaped structure, of the wedge-shaped structure.

In the longitudinal direction 935 of the shock absorbing fixed shaft, the shock absorbing adjusting piece 950 may be moved to change the distance between the second shock absorbing fixed part 912 and the third shock absorbing fixed part 913, so as to adjust the angle between the shock absorbing moving bracket 920 that is externally arranged on the shock absorbing fixed shaft 930 in a sleeving manner and the third shock absorbing fixed part 913, and then adjust the angle between the connecting shaft of the wheel and the third shock absorbing fixed part 913, that is, adjust the perpendicularity of the wheel, thereby reducing the shock of the mecanum wheel during traveling.

Referring to FIG. 2H, in an optional solution of the present embodiment, the shock absorbing adjusting piece 950 includes an adjusting fitting part 951 and an adjusting threaded part 952 that is fixedly connected to the adjusting fitting part 951. The adjusting fitting part 951 is of a wedge-shaped structure. Optionally, in the extension direction of the shock absorbing adjusting piece 950, the surface, connected to second shock absorbing fixed part 912, of the adjusting fitting part 951 is a wedge-shaped surface, and/or, in the extension direction of the shock absorbing adjusting piece 950, the surface, connected to the third shock absorbing fixed part 913, of the adjusting fitting part 951 is a wedge-shaped surface. Optionally, in the extension direction of the shock absorbing adjusting piece 950, in the extension direction of the shock absorbing adjusting piece 950, the surface, connected to second shock absorbing fixed part 912, of the adjusting fitting part 951 is a wedge-shaped surface. The surface, connected to the third shock absorbing fixed part 913, of the adjusting fitting part 951 is parallel to the extension direction of the shock absorbing adjusting piece 950.

The adjusting fitting part 951 is arranged between the second shock absorbing fixed part 912 and the third shock absorbing fixed part 913;

optionally, the adjusting threaded part 952 is in threaded connection with an adjusting nut 953. The adjusting nut 953 is pressed against one surface, far away from the shock absorbing moving bracket, the second shock absorbing fixed part 912;

when the adjusting nut 953 is rotated, the shock absorbing adjusting piece 950 may be moved to change the distance between the second shock absorbing fixed part 912 and the third shock absorbing fixed part 913. The adjusting nut 953 fits the shock absorbing moving bracket 952 to finely adjust the angle between the shock absorbing moving bracket 920 that is arranged outside the shock absorbing fixed shaft 930 in a sleeving manner and the third shock absorbing fixed part 913, and then finely adjust the angle between the connecting shaft of the wheel and the third shock absorbing fixed part 913, that is, finely adjust the perpendicularity of the wheel, thereby reducing the shock of the wheel during traveling.

Referring to FIG. 2H, in an optional solution of the present embodiment, an adjusting through hole (not shown in the drawings) is formed in the adjusting fitting part 951. A screw for connecting the second shock absorbing fixed part 912 and the third shock absorbing fixed part 913 is plugged in the adjusting through hole. Optionally, the adjusting through hole is a slotted hole, so as to facilitate the movement of the screw in the adjusting through hole. Optionally, when there are a plurality of shock absorbing adjusting pieces 950, there are a plurality of screws for connecting the second shock absorbing fixed part 912 and the third shock absorbing fixed part 913. The screws for connecting the second shock absorbing fixed part 912 and the third shock absorbing fixed part 913 are in one-to-one correspondence with the shock absorbing adjusting pieces 950.

Referring to FIG. 2H, in an optional solution of the present embodiment, an adjusting fitting protrusion part 954 is formed at one end, far away from the adjusting threaded part 952, of the adjusting fitting part 951;

the adjusting fitting protrusion part 954 is protruded from the wedge-shaped surface of the adjusting fitting part 951;

the wedge-shaped surface of the adjusting fitting part 951 is connected to the second shock absorbing fixed part 912. The adjusting fitting protrusion part 954 is adjusted to ensure that the shock absorbing adjusting piece 950 is located between the second shock absorbing fixed part 912 and the third shock absorbing fixed part 913 to prevent the shock absorbing adjusting piece 950 from falling off.

Referring to FIG. 2C to FIG. 2G, in an optional solution of the present embodiment, the shock absorbing fixed bracket 910 includes a shock absorbing mounting piece 940;

the shock absorbing mounting piece 940, the first shock absorbing fixed part 911, and the second shock absorbing fixed part 912 are arranged on the shock absorbing fixed shaft at intervals in sequence;

equipment is fixedly connected between the shock absorbing mounting piece 940 and the first shock absorbing fixed part 911. Corresponding connecting parts of the equipment are clamped by the shock absorbing mounting piece 940 and the first shock absorbing fixed part 911, so as to improve the connection firmness of the shock absorbing device and the equipment.

According to the shock absorbing device and the mecanum wheel with a shock absorbing device provided by the present embodiment, the shock absorbing device may be of other structures. Other features disclosed by the shock absorbing device and the mecanum wheel with a shock absorbing device are also suitable for the shock absorbing device, which will not be described in detail herein.

Referring to FIG. 2I to FIG. 2J, optionally, the shock absorbing device 9 includes a shock absorbing fixed bracket 910 and a shock absorbing moving bracket 920. The shock absorbing moving bracket 920 is fixedly connected to a connecting shaft of a wheel. For example, the shock absorbing moving bracket 920 is fixedly connected to the connecting shaft of the drive wheel 320 of the mecanum wheel 3.

The shock absorbing fixed bracket 910 includes at least one shock absorbing fixed shaft 930. The shock absorbing moving bracket 920 is arranged outside the shock absorbing fixed shaft 930 in a sleeving manner and may move reciprocally in the longitudinal direction 935 of the shock absorbing fixed shaft 930, so that wheels, such as the mecanum wheel 3, may move reciprocally in the longitudinal direction 935 of the shock absorbing fixed shaft 930 along with the shock absorbing moving bracket 920. Optionally, the number of the shock absorbing fixed shaft 930 is one, two, four, five, or the like. Optionally, the shock absorbing fixed shafts 930 are arranged pairwise.

Optionally, elastic elements 931 that are pressed against the shock absorbing moving bracket 920 are arranged outside the shock absorbing fixed shaft 930 in a sleeving manner. The elastic elements 931 are in a compressed state, so as to reduce the axial reciprocating movement of the shock absorbing moving bracket 920 in the longitudinal direction 935 of the shock absorbing fixed shafts 930.

Optionally, the longitudinal direction 935 of the shock absorbing fixed shaft 930 and the axial direction of a connecting shaft of a wheel are arranged at an included angle. For example, the longitudinal direction 935 of the shock absorbing fixed shaft 930 and the axial direction 322 of the connecting shaft 321 of the drive device 320 are arranged at an included angle. Optionally, the longitudinal direction 935 of the shock absorbing fixed shaft 930 and the axial direction of a connecting shaft of a wheel are arranged at a right angle or an approximate right angle. For example, the longitudinal direction 935 of the shock absorbing fixed shaft 930 and the axial direction 322 of the connecting shaft 321 of the drive device 320 are arranged at a right angle or an approximate right angle. Therefore, the two elastic elements 931 on the shock absorbing fixed shaft 930 can well reduce the shock on the equipment, such as an assistant robot, when wheels, such as the mecanum wheel 3, travel.

According to the shock absorbing device, the shock generated when the wheels, such as the mecanum wheel 3, travel may be absorbed by the elastic elements 931 through the shock absorbing fixed bracket 910, the shock absorbing moving bracket 920, and the elastic elements 931. The shock absorbing device 9 is simple and compact in structure and relatively low in cost, facilitates production and processing, can well reduce the shock on the equipment, such as an assistant robot, when the mecanum wheel 3 travels, and can also make the structures of the equipment, such as the assistant robot, more compact.

Referring to FIG. 2I to FIG. 2J, optionally, the shock absorbing fixed bracket 910 includes a shock absorbing fixing leveling mounting piece 914 and a shock absorbing fixed mounting piece 915;

the shock absorbing fixing leveling mounting piece 914 is configured to be fixedly connected to the equipment. The shock absorbing fixing leveling mounting piece 914 is fixedly connected to the equipment to connect the shock absorbing device 9 to the equipment, and then the mecanum wheel with a shock absorbing device is connected to the equipment. The equipment, for example, may be an assistant robot and a vehicle.

The shock absorbing fixing leveling shafting piece 915 is detachably and fixedly connected to the shock absorbing fixed shaft 930. A shock absorbing fixed shaft stop part 932 is formed at one end, far away from the shock absorbing fixing leveling shafting piece 915, of the shock absorbing fixed shaft 930. The elastic elements 931 and the shock absorbing moving bracket 920 are arranged between the shock absorbing fixed shaft stop part 932 and the shock absorbing fixing leveling shafting piece 915. Optionally, the shock absorbing fixed shaft stop part 932, the elastic elements 931, the shock absorbing moving bracket 920, and the shock absorbing fixing leveling shafting piece 915 are arranged in sequence in the longitudinal direction 935 of the shock absorbing fixed shaft 930. Optionally, the shock absorbing fixed shaft stop part 932, the shock absorbing moving bracket 920, the elastic elements 931, and the shock absorbing fixing leveling shafting piece 915 are arranged in sequence in the longitudinal direction 935 of the shock absorbing fixed shaft 930.

The shock absorbing fixing leveling mounting piece 914 is hinged to the shock absorbing fixing leveling shafting piece 915, and the shock absorbing fixing leveling mounting piece 914 and the shock absorbing fixing leveling shafting piece 915 are connected to leveling connecting piece 917. The leveling connecting piece 917 may adjust the angle between the shock absorbing fixing leveling mounting piece 914 and the shock absorbing fixing leveling shafting piece 915. The angle between the shock absorbing fixing leveling mounting piece 914 and the shock absorbing fixing leveling shafting piece 915 is finely adjusted by the leveling connecting piece 917 to finely adjust the angle between the equipment that is fixedly connected to the shock absorbing fixing leveling mounting piece 914 and the shock absorbing fixed shaft 930 that is fixedly connected to the shock absorbing fixing leveling shafting piece 915, so as to finely adjust the angle between the equipment and a connecting shaft of wheels, such as a mecanum wheel, that is, finely adjust the perpendicularity of the wheels, such as the mecanum wheel, thereby reducing the shock of the wheels, such as the mecanum wheel, during traveling.

Referring to FIG. 2J, optionally, the shock absorbing fixing leveling mounting piece 914 is hinged to the shock absorbing fixing leveling shafting piece 915 through a pin shaft 916.

Referring to FIG. 2I to FIG. 2J, optionally, the leveling connecting piece 917 is in threaded connection with the shock absorbing fixing leveling mounting piece 914, and the leveling connecting piece 917 may penetrate through the shock absorbing fixing leveling mounting piece 914 to press against the shock absorbing fixing leveling shafting piece 915. That is to say, a threaded hole 9171 that is in threaded connection with the leveling connecting piece 917 is formed in the shock absorbing fixing leveling mounting piece 914. The leveling connecting piece 917 is in threaded connection with the shock absorbing fixing leveling mounting piece 914, and the leveling connecting piece 917 is pressed against the shock absorbing fixing leveling shafting piece 915, so that the distance between the shock absorbing fixing leveling mounting piece 914 and the shock absorbing fixing leveling shafting piece 915 is finely adjusted, thereby finely adjusting the angle between the shock absorbing fixing leveling mounting piece 914 and the shock absorbing fixing leveling shafting piece 915.

Referring to FIG. FIG. 2I to FIG. 2J, optionally, the shock absorbing fixing leveling mounting piece 914 is connected to the shock absorbing fixing leveling shafting piece 915 through at least one leveling connecting screw 918, so that the angle between the shock absorbing fixing leveling mounting piece 914 and the shock absorbing fixing leveling shafting piece 915 is fixed by the leveling connecting screw 918 after being finely adjusted by the leveling connecting piece 917. Optionally, the number of the leveling connecting screw 918 is one, two, three, five or the like. As shown in FIG. 2I to FIG. 2J, the number of the leveling connecting screws 918 is two, and the leveling connecting piece 917 is connected between the two leveling connecting screws 918.

Optionally, circular holes, strip-shaped holes, or slotted holes for plugging the leveling connecting screws 918 are formed in the shock absorbing fixing leveling mounting piece 914. As shown in FIG. 2J, slotted holes 9181 for plugging the leveling connecting screws 918 are formed in the shock absorbing fixing leveling mounting piece 914.

As shown in FIG. 2J, optionally, threaded holes 9182 that are threaded with the leveling connecting screws 918 are formed in the shock absorbing fixing leveling shafting piece 915, or one surface, far away from the shock absorbing fixing leveling mounting piece 914, of the shock absorbing fixing leveling shafting piece 915 is connected to the nuts that are in threaded connection with the leveling connecting screws 918.

As shown in FIG. 2I to FIG. 2J, optionally, the elastic elements 931 are springs. An energy absorbing element 933 is arranged outside the shock absorbing fixed shaft 930 in a sleeving manner. The energy absorbing element 933 may deform elastically;

the shock absorbing moving bracket 920 is arranged between the energy absorbing element 933 and the elastic element 931. The spring can be prevented from being directly and rigidly connected to the shock absorbing fixed shaft stop part 932 through the energy absorbing element 933, so as to reduce or absorb the shock generated by the spring.

Optionally, the energy absorbing element 933 includes a polyurethane structural part, a rubber loop, a silicone loop, or other elastic elements. The polyurethane structural part may be a polyurethane loop, a polyurethane ring, a polyurethane block, or the like.

Referring to FIG. 2J, optionally, a gasket 934 is arranged outside the shock absorbing fixed shaft 930 in a sleeving manner;

the shock absorbing fixed shaft stop part 932, the gasket 934, the energy absorbing element 933, the shock absorbing moving bracket 920, the elastic elements 931, and the shock absorbing fixing leveling shafting piece 915 are arranged in sequence in the longitudinal direction 935 of the shock absorbing fixed shaft 930; the energy absorbing element 933 with elastic deformation is prevented from being in direct contact with the shock absorbing fixed shaft stop part 932 through the gasket 934, so as to prolong the service life of the energy absorbing element 933.

Referring to FIG. 2I to FIG. 2J, optionally, the elastic elements 931 are arranged between the shock absorbing moving bracket 920 and the shock absorbing fixing leveling shafting piece 30) 915. Counterbores that are in fit connection with the elastic elements 931 are formed in the shock absorbing moving bracket 920 and/or the shock absorbing fixing leveling shafting piece 915. The fit degree between the elastic element 931 and the shock absorbing moving bracket 920 or the shock absorbing fixing leveling shafting piece 915 is improved through the counterbores.

Referring to FIG. 2I to FIG. 2J, optionally, a shock absorbing fixed shaft threaded part is arranged at one end, far away from the shock absorbing fixed shaft stop part 932, of the shock absorbing fixing leveling shafting piece 915. A threaded hole that is in threaded connection with the shock absorbing fixed shaft threaded part is formed in the shock absorbing fixing leveling shafting piece 915. The compressed sizes of the elastic elements 931 may be adjusted by the threaded connection between the shock absorbing fixed shaft threaded part and the shock absorbing fixing leveling shafting piece 915, so as to finely adjust the elastic force of the elastic element 931.

Optionally, a bearing is arranged between the shock absorbing moving bracket 920 and the shock absorbing fixed shaft 930. The mounting between the shock absorbing fixed shaft 930 and the shock absorbing moving bracket 920 is facilitated through the bearing, meanwhile, the mounting accuracy between the shock absorbing fixed shaft 930 and the shock absorbing moving bracket 920 can also be improved, and the noise produced by the shock absorbing moving bracket 920 and the shock absorbing fixed shaft 930 can also be reduced.

The present embodiment provides a chassis. The chassis includes the mecanum wheel with a shock absorbing device. The technical features of the mecanum wheel and the mecanum wheel with a shock absorbing device disclosed above are also suitable for the chassis.

Figure 3A:
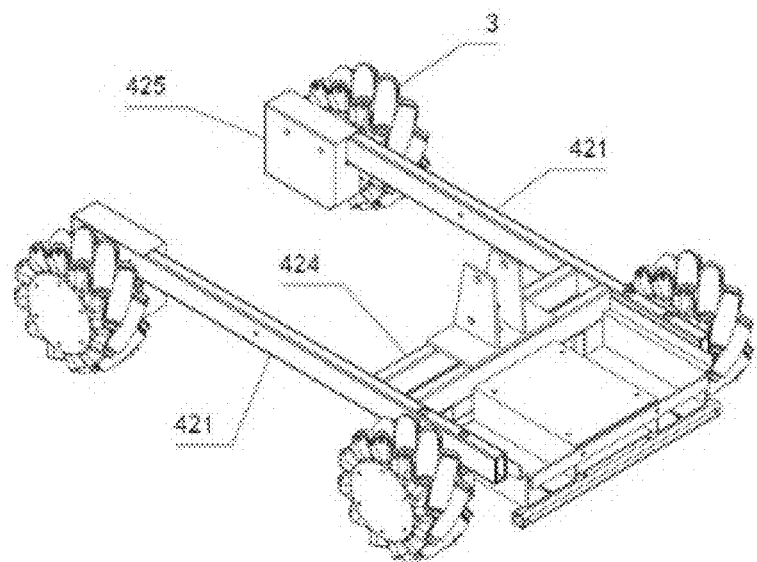
FIG. 3A is a schematic structural diagram of a chassis provided by the embodiments of the present disclosure.
Figure 3B:
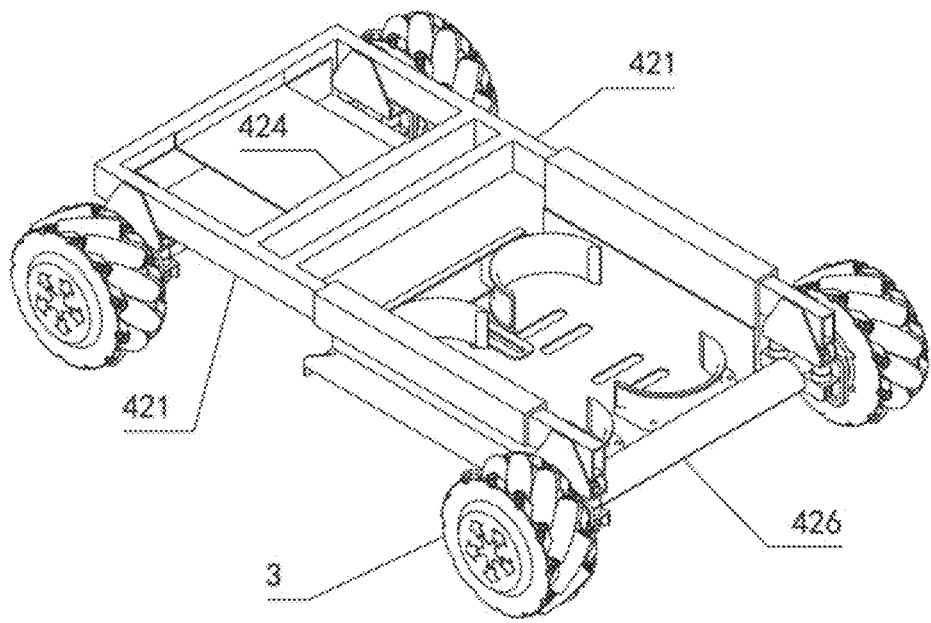
FIG. 3B is an another schematic structural diagram of the chassis provided by the embodiments of the present disclosure.

FIG. 3A and FIG. 3B are two schematic structural diagrams of a chassis provided by the present embodiment.

Referring to FIG. 3A and FIG. 3B, the chassis includes at least one pair of mecanum wheels with shock absorbing devices. The shock transferred to the chassis by the mecanum wheel 3 can be retarded by the mecanum wheel with a shock absorbing device, so that the shock of the overall chassis when traveling on a road surface may be effectively retarded, thereby ensuring the stability and the horizontality of the equipment with the chassis in a moving process. By using the mecanum wheel with a shock absorbing device, the structure of the chassis may also be simplified, and the cost of the chassis may also be reduced.

In an optional solution of the present embodiment, the chassis includes a chassis cross beam 424 and two fixed beams 421. The chassis cross beam is 424 is fixedly connected to the two fixed beams 421;

the extension direction of the fixed beam 421 is the traveling direction of the chassis. The fixed beam 421 is connected to the shock absorbing device 9 of the mecanum wheel with a shock absorbing device;

the pairwise arranged mecanum wheels with the shock absorbing devices are arranged on the same ends of the fixed beams 421, and each of the fixed beams 421 is at least connected to one mecanum wheel with a shock absorbing device so as to reduce the shock generated on the chassis by the mecanum wheel 3, thereby improving the stability and the horizontality of the chassis in a moving process.

In an optional solution of the present embodiment, the two ends of each of the fixed beams 421 are respectively connected to the shock absorbing devices 9 of the mecanum wheels with shock absorbing devices. That is to say, the chassis is provided with four mecanum wheels with the shock absorbing devices. The mecanum wheels with shock absorbing devices are arranged in the four corners of the chassis to further reduce the shock generated on the chassis by the mecanum wheels 3, so as to improve the stability and the horizontality of the chassis in a moving process.

In the present embodiment, in the traveling direction of the chassis, a pair of the mecanum wheels 3 with shock absorbing devices may be arranged at two ends of the chassis, or a pair of the mecanum wheels 3 with shock absorbing devices may be arranged at one end of the chassis, and ordinary rollers or rollers with a shock absorbing function are arranged at the other end of the chassis.

Optionally, for example, one end of the fixed beam 421 is connected to a mecanum wheel with a shock absorbing device, and the other end of the fixed beam is connected to a roller through a second shock absorbing device 9. The second shock absorbing device 9 includes a strut and a second shock absorber. An end part of the strut is hinged to the second shock absorber. The strut is hinged to the fixed beam 421. The second shock absorber is hinged to the fixed beam 421. A roller shaft of a roller is fixedly connected to the strut.

Optionally, the roller is the mecanum wheel 3, a connecting shaft 321 of the drive device 320 of the mecanum wheel 3 is fixedly connected to the strut.

Optionally, the second shock absorber is a hydraulic shock absorber or a spring shock absorber.

Optionally, the fixed beam 421 is fixedly connected to a shock absorbing cover 425 which covers the shock absorbing device 9. The shock absorbing device 9 is protected by the shock absorbing cover 425.

Referring to FIG. 3B, optionally, the pairwise arranged mecanum wheels with shock absorbing devices are connected through a chassis wheel axle 426. The chassis wheel axle 426 is connected to the pairwise arranged mecanum wheels with shock absorbing devices to improve the connecting rigidity between the pairwise arranged mecanum wheels with shock absorbing devices, so that the shock of the chassis may be reduced to a certain extent.

The present embodiment provides an assistant robot. The assistant robot includes the chassis. The technical features of the mecanum wheel, the mecanum wheel with the shock absorbing device, and the chassis disclosed above are also suitable for the assistant robot.

Figure 4A:
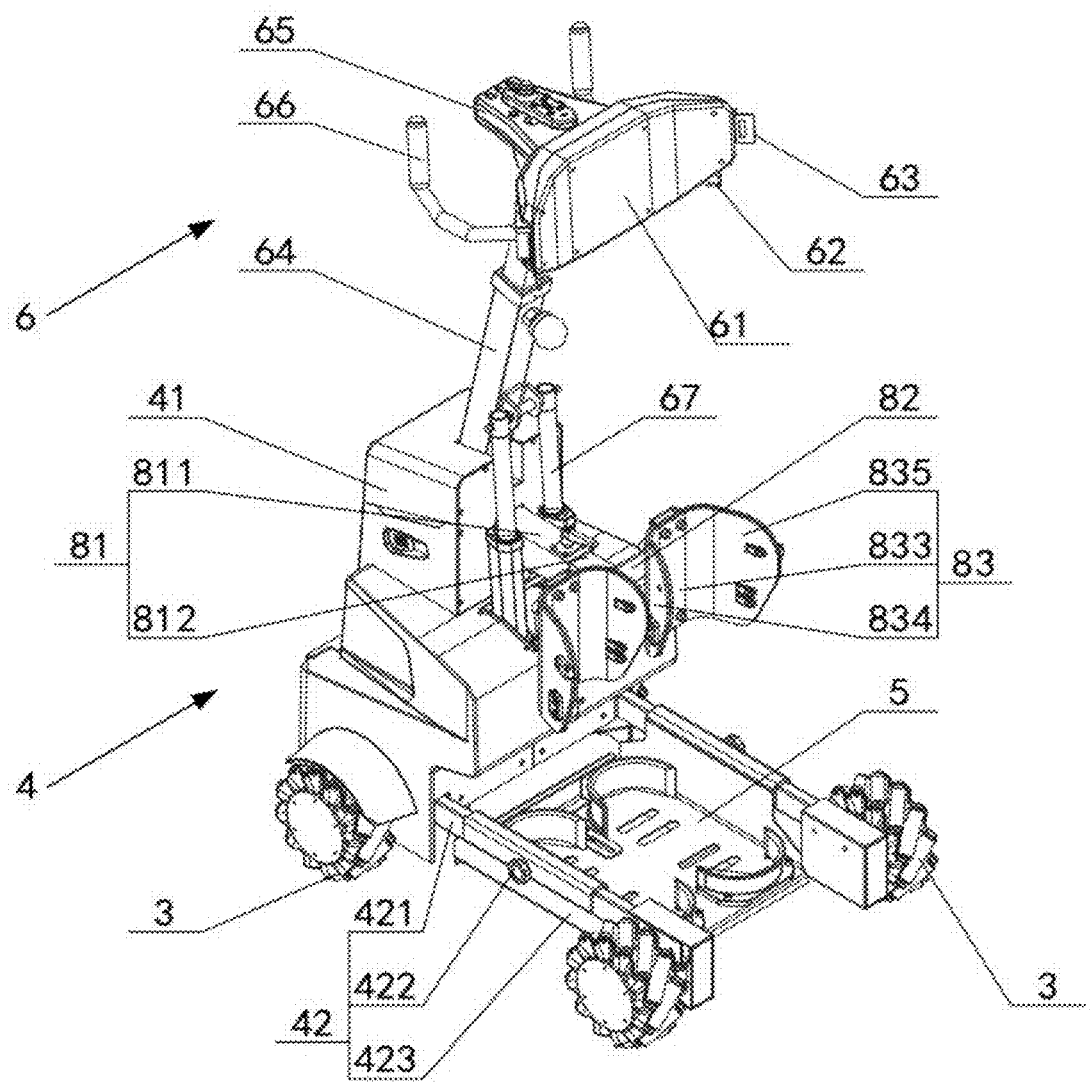
FIG. 4A is a perspective schematic structural diagram of an assistant robot provided by the embodiments of the present disclosure.
Figure 4B:
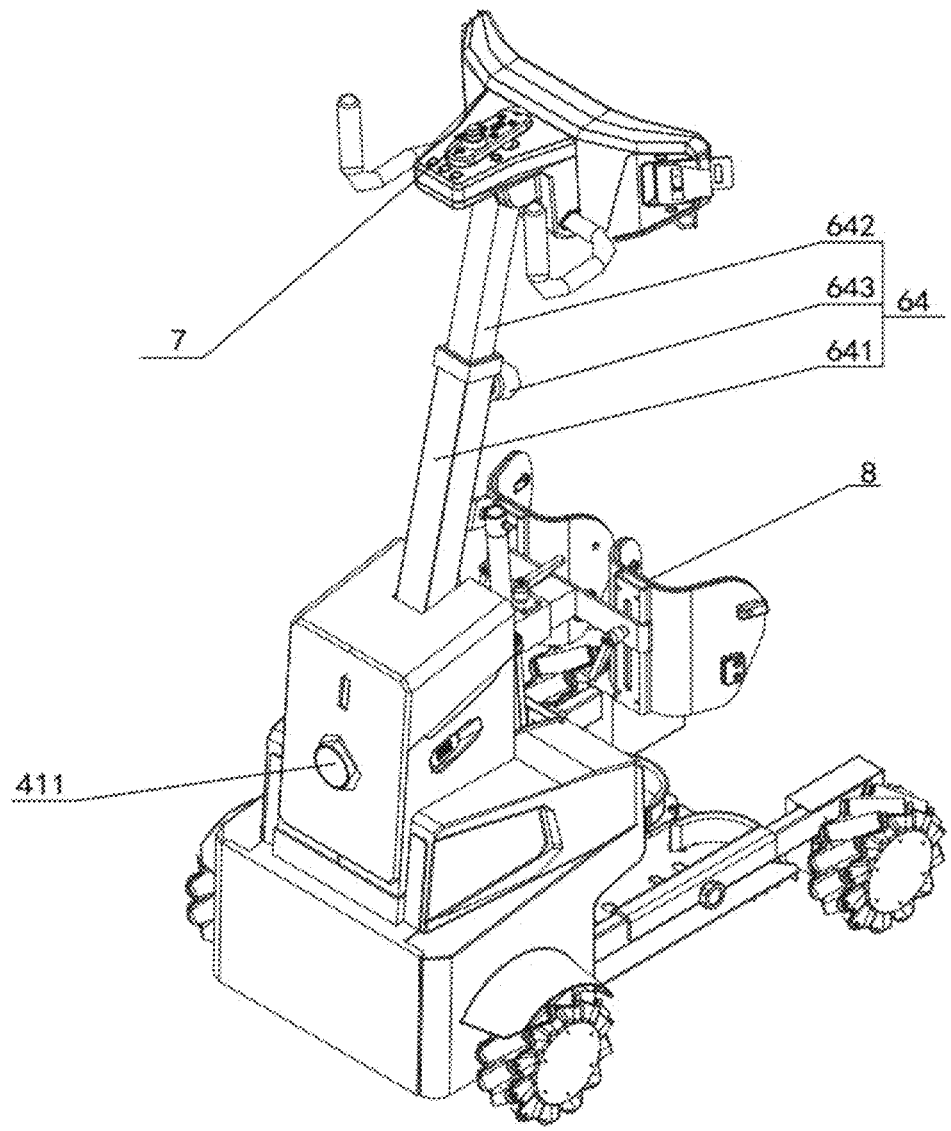
FIG. 4B is a schematic structural diagram of the assistant robot provided by the embodiments of the present disclosure from another view angle.
Figure 4C:
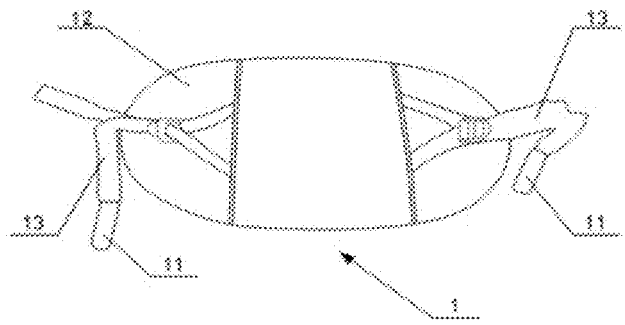
FIG. 4C is a schematic structural diagram of a hip supporting strap provided by the embodiments of the present disclosure.
Figure 4D:
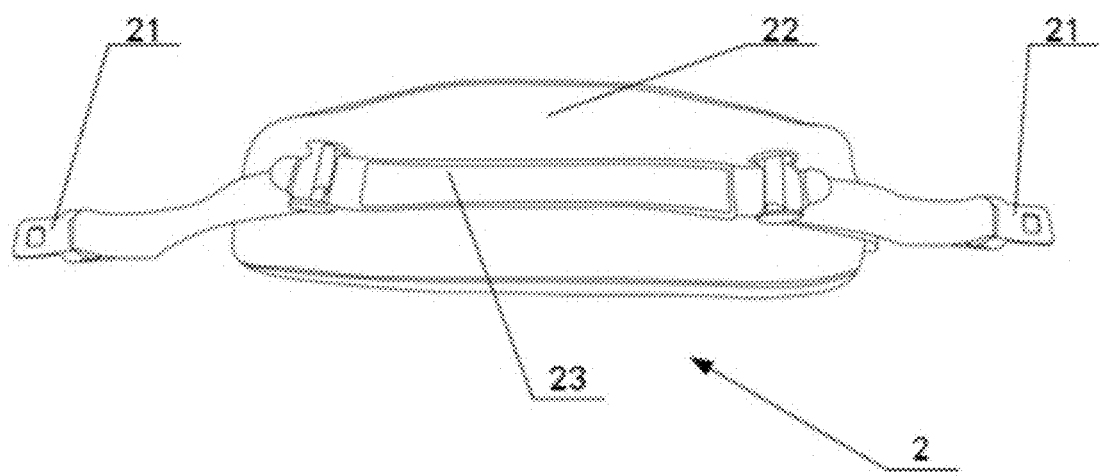
FIG. 4D is a schematic structural diagram of a waist holding strap provided by the embodiments of the present disclosure.

Referring to FIG. 4A to FIG. 4D, FIG. 4A and FIG. 4B are perspective schematic structural diagrams of an assistant robot provided by the present embodiment from two angles. FIG. 4C is a schematic structural diagram of a hip supporting strap provided by the present embodiment. FIG. 4D is a schematic structural diagram of a waist holding strap provided by the present embodiment.

Referring to FIG. 4A to FIG. 4D, the assistant robot includes a chassis 42, and further includes a hip supporting strap 1, a waist holding strap 2, and a robot body 4. The chassis 42 and a lifting support mechanism 6 are arranged on the robot body 4. The lifting support mechanism 6 includes a chest pressing plate 61. First connecting pieces 62 is arranged on a lower end surface of the chest pressing plate 61, and second connecting pieces 63 are arranged on a side wall of the chest pressing plate. The hip supporting strap 1 is provided with third connecting pieces 11 that are matched and butted with the first connecting pieces 62. The waist holding strap 2 is provided with fourth connecting pieces 21 that are matched and butted with the second connecting pieces 63. Optionally, the chassis 42 is arranged at the bottom of the robot body. Optionally, a footrest supporting plate 5 is arranged on the chassis 42.

Compared with the prior art, the assistant robot of the present embodiment has the following advantages:

According to the assistant robot provided by the present embodiment, the assistant robot may be controlled to perform posture transformation, horizontal movement, or rotation movement by laying the hip supporting strap 1, enabling a user to move here and sit down, then connecting the third connecting pieces 11 on the hip supporting strap 1 to the first connecting pieces 62 on the assistant robot, placing the waist holding strap 2 on the back wait of the user, connecting the fourth connecting pieces 21 on the waist holding strap 2 to the second connecting pieces 63 on the assistant robot, and finally, tightening the hip supporting strap 1 and the waist holding strap 2 to make the hip supporting strap 1 and the waist holding strap 2 be in tight fit with the hip and the waist of the user. It can be known from the analysis that the assistant robot provided by the present embodiment can ensure that the user has a standing posture and a sitting posture, and can also effectively lighten the weight of the overall robot, so as to simplify the structure of the assistant robot, thereby effectively improving the flexibility thereof.

To effectively improve the connecting firmness of the hip supporting strap 1 and the waist holding strap 2, as shown in FIG. 4A, the first connecting pieces 62 may useannular buckles, and the second connecting pieces may use aviation lock catches. Correspondingly, the third connecting pieces 11 may use ISOFIX connectors, and the fourth connecting pieces 21 may use aviation insertion pieces.

Specifically, as shown in FIG. 4C, the hip supporting strap 1 may include a hip supporting body 12, and a hip supporting adjusting belt 13 arranged on the hip supporting body 12. The ISOFIX connector may be arranged at a free end of the hip supporting adjusting belt 13, so that the fixation of the hip supporting strap 1 may be realized by butting the ISOFIX connector and the annular buckle. As shown in FIG. 4D, the waist holding strap 2 may include a waist holding body 22 and a waist holding adjusting belt 23 arranged on the waist holding body 22. The aviation insertion piece may be arranged on at a free end of the waist holding adjusting belt 23, so that the fixation of the waist holding strap 2 may be realized by butting the aviation insertion piece and the aviation lock catch.

The full name of the ISOFIX is "International Standards Organisation FIX", and its Chinese meaning is international standards organisation fixing device.

It should be added that the hip supporting body 12 and the waist holding body 22 may respectively include: an outer leather layer, an intermediate sponge filling layer, and an inner anti-skid cloth layer, and the edges of the corresponding sides of the leather layer and the anti-skid cloth layer may be movably connected through a zipper or a snap button, so that the sponge filling layer is a detachable structural part. Therefore, the sponge filling layer may be placed in when the assistant robot is used in winter, and may be taken out when the assistant robot is used in summer. In addition, the anti-skid cloth layer may be provided with a latticed ventilation mesh, so that the air permeability of the hip supporting body is effectively improved through the latticed ventilation mesh, thereby effectively avoiding an obvious sweating phenomenon of the user caused by the hip supporting strap. Optionally, the latticed ventilation mesh which is uniformly distributed on the anti-skid cloth may also be dispensed adhesive, so that an anti-skid effect is further effectively improved through the arrangement of the dispensed adhesive.

Further, in order to effectively ensure the comfort level of the hip supporting strap 1 and the waist holding strap 2, the thickness of the sponge filling layer may be 3 cm.

In order to make the hip supporting strap 1 and the waist holding strap 2 be capable of adapting to users of different figures well, adjustment buckles may be arranged on the hip supporting strap 1 and the waist holding strap 2 in a penetrating manner, so that the lengths of the hip supporting strap 1 and the waist holding strap 2 may be effectively adjusted by the adjustment buckles; therefore, the hip supporting strap 1 and the waist holding strap 2 may be adapted to the users of different figures well.

Optionally, as shown in FIG. 4A, the robot body 4 may include a vehicle body 41, and a chassis 42 connected to a bottom end area of the vehicle body 41. In actual assembling, the lifting support mechanism 6 may be connected to the vehicle body 41, and the footrest supporting plate 5 is arranged on the chassis 42.

In an optional solution of the present embodiment, referring to FIG. 4A and FIG. 4B, the lifting support mechanism 6 may include a support rod 64. One end of the support rod 64 is hinged to the robot body 4. A console 65 is arranged at the other end of the support rod. The console 65 may be connected to handles 66 and a chest pressing plate 61. A drive assembly 67 is further connected between the support rod 64 and the robot body 4, so that the drive assembly 67 may make the support rod 64 in a first state or a second state, and be capable of switching between the first state and the second state.

It should be added that the first state may correspond to a sitting posture, and the second state may correspond to a standing posture. The drive assembly 67 may be an electric push rod. When the electric push rod extends out, the support rod 64 is in a vertical state and corresponds to the second state (standing posture). When the electric push rod retracts, the support rod 64 is in a horizontal state and corresponds to the first state (sitting posture). Of course, the drive assembly 67 may also be a hydraulic push rod, a pneumatic push rod, or the like, which is not limited here.

In addition, the handles 66, the chest pressing plate 61, and the support rod 64 are arranged integrally, which is beneficial to the stability and safety when the user changes his posture.

Optionally, as shown in FIG. 4B, when the support rod 64 is in the first state (sitting posture), the assistant robot has the height lower than 0.8 meter, so it may move under the table to ensure that the user completes work at a desk or daily dining.

It should be added that the user may be in contact with a closestool by his hips to complete preparation of defecation by releasing the hip supporting strap 1 and descending the lifting support mechanism 6, and may be driven, by ascending the lifting support mechanism 6, to stand up from the closestool through the waist holding strap 2 fixed to the back.

Optionally, as shown in FIG. 4B, the support rod 64 may include: a primary rod 641 and a secondary rod 642 that is arranged in the primary rod 641 in a penetrating manner. The secondary rod 642 may be connected to the primary rod 641 through a movable piece 643, and the secondary rod 642 may be moved in the primary rod 641 telescopically and fixed through the movable piece 643, so that the height of the support rod 64 is adjusted to adapt to the users of different heights (for example 150 cm to 190 cm).

Optionally, a power switch and at least two gears of speed regulating switches may be arranged on the console 65; in addition, a groove is formed in the console 65. The groove may be configured to hold a remote control 7 and charge the remote control 7.

Optionally, a control assembly is arranged in the robot body 4. The control assembly is connected to the drive assembly 67, and is configured to control the support rod 64 to ascend and descend. In addition, the remote control may be connected to the control assembly in a wireless connection manner, so that the remote control may remotely control the assistant robot to move.

Optionally, to effectively improve the safety of the assistant robot, when the power switch is turned on, the assistant robot is in a braking state by default. In addition, a control switch is arranged on the remote control 7, and when both the control switch and the power switch are in an on-state, the remote control 7 may remotely control the assistant robot to move, or control the assistant robot to perform posture transformation, horizontal movement, or rotation movement.

It should be added that an ascending key, a descending key, a direction rocker, a clockwise rotating key, and a counterclockwise rotating key are arranged on the remote control 7. The ascending and descending height is adjusted to realize the functions of standing and sitting by pressing the ascending key and the descending key. The horizontal movement in four directions of forward, backward, leftward, and rightward may be realized by rocking the direction rocker with a hand. Rotating movement of the robot is realized by pressing the clockwise rotating key and the counterclockwise rotating key.

In addition, a lighting lamp on-off key and an SOS key may further be arranged on the remote control 7. A lighting lamp on a host of the robot is remotely controlled to be turned on or turned off by pressing the lighting lamp on-off key. An alarm for calling for help may be realized immediately by pressing the SOS key. When the host of the robot is in an activated state, the host of the robot gives an alarm for calling for help simultaneously (the alarm for calling for help is stopped by pressing the SOS key again).

Optionally, the chest pressing plate 61 may include: an EVA filling layer, and a leather layer that coats outside the EVA filling layer. In addition, two sides of the lower end of the chest pressing plate 61 may be of arc-shaped structures that are folded upwards, so that a space between the chest pressing plate 61 and legs is effectively enlarged after the chest pressing plate 61 is descended, thereby improving the comfort level.

EVA refers to ethylene-vinyl acetate copolymer, and a rubber and plastic foaming material made from the ethylene-vinyl acetate copolymer.

Optionally, as shown in FIG. 4A, the chassis 42 may include: fixed beams 421, and movable beams 423 that are connected to the fixed beams 421 through fixing pieces 422. In specific assembling, the mecanum wheels 3 are connected to the fixed beams 421, and the footrest supporting plate 5 is connected to the movable beams 423, so that the movable beams 423 may drive the footrest supporting plate 5 to move in the direction, far away from or close to a vehicle body 41, relative to the fixed beams 421 and be fixed through the fixing pieces 422, thereby adapting to the users of different heights and figures better.

Optionally, as shown in FIG. 4A, the assistant robot provided by the present embodiment may further include: a knee pressing mechanism 8 connected to the vehicle body 41. The knee pressing mechanism 8 may include: a horizontal beam 81. One end of the horizontal beam 81 is connected to the vehicle body 41. The other end of the horizontal beam 81 is connected to a cross beam 82. Two knee pressing plates 83 that are movably connected are symmetrically arranged on the cross beam 82.

Optionally, as shown in FIG. 4A, the horizontal beam 81 may include: a primary beam 811 and a secondary beam 812. One end of the primary beam 811 is connected to the vehicle body 41. One end of the secondary beam 812 is arranged in the primary beam 811 in a penetrating manner, and the other end of the secondary beam is connected to the knee pressing plates 83, so that the secondary beam 812 may drive the knee pressing plates 83 to move in the direction, far away from or close to the vehicle body 41, relative to the primary beam 811 and be fixed, thereby adapting to the users of different heights and figures better.

Optionally, connecting holes are formed in the cross beam 82, and a strip-shaped groove is longitudinally formed in the knee pressing plate 83, so when the connecting holes correspond to different positions of the strip-shaped groove and are fixed by bolts, the knee pressing plate 83 may be located at different heights, thereby adapting to the users of different heights and figures better.

Optionally, as shown in FIG. 4A, the knee pressing plate 83 may include: an intermediate plate 833 connected to the cross beam 82, and an inner side plate 834 and an outer side plate 835 that are respectively connected to the two sides of the intermediate plate 833. In addition, the size of the outer side plate 835 is preferably greater than that of the inner side plate 834. This design may adapt to the users with different thigh thicknesses, and may also prevent the users from knock knees.

Preferably, a soft package material structural part is arranged on one side, in contact with the user, of the knee pressing plate 83, so that the comfort level may be effectively improved.

Optionally, a lighting lamp 411 may be arranged on the front side of the vehicle body 41. An indicating lamp may also be arranged on the vehicle body 41. Specifically, the indicating lamp may include: any one or more of a charging standby state (for example, green is normally on), a startup charging state (for example, green is flashing), a normal startup state (for example, blue is flashing), a standby state (the blue is normally on), and an alarm state (red is flashing).

The assistant robot provided by the present embodiment may further include: a sound prompt device. The sound prompt device may be configured to prompt the state of the assistant robot, or give a hazard alarm.

In addition, a square metal tube transversely fixed to the front of the vehicle body 41 may be an anti-collision beam.

The present embodiment further provides a control method for an assistant robot. The assistant robot is provided with a power switch, and remote control is provided with a control switch. When the power switch is turned on, the assistant robot is in a braking state by default. When both the control switch and the power switch are in an on-state, the remote control may remotely control the assistant robot to move, or control the assistant robot to perform posture transformation, horizontal movement, or rotation movement.

The assistant robot and the control method thereof provided by the present embodiment can ensure that the user has a standing posture and a sitting posture, and can also effectively lighten the weight of the overall robot and simplify the structure of the assistant robot, thereby effectively improving the flexibility thereof.

In addition, in the control method for the assistant robot provided by the present embodiment, when the power switch is turned on, the assistant robot is in the braking state by default, so that the safety of the user may be effectively improved. When both the control switch and the power switch are in an on-state, the remote control can remotely control the assistant robot to move, or control the assistant robot to perform posture transformation, horizontal movement, or rotation movement, so that the assistant robot is more convenient and faster to use.

According to the assistant robot provided by the present embodiment, the parts, in contact with a human body, of the assistant robot all adopt ergonomic designs. Textiles are firm and comfortable, and facilitate wearing of users.

The remote control may remotely control the assistant robot to perform various types of plane movement, may also be carried on a robot matrix for use, and carried on the robot to prompt the electric power that may be provided by the robot body. All movement operations of the robot are controlled by the remote control. The remote control may also operate to turn on or turn off the lamp, call for help, remotely control the robot to start up or shut down, and the like.

Adaptive users, for example, may include the following groups: 1. users with paraplegia due to disease or trauma and capacity of controlling their hands; 2. people whose legs are unable to travel normally due to disease or aging; 3. people who can stand with the help of external facilities, such as crutches.

Finally, it should be noted that: the above embodiments are only used to illustrate the technical solutions disclosed by the present disclosure, not to limit them. Although the present disclosure has been described in detail with reference to the above-mentioned embodiments, those of ordinary skill in the art should understand that: modifications may still be made to the technical solutions recorded in the above-mentioned embodiments, or equivalent replacements may be made to some or all of the technical features therein. However, these modifications or replacements do not make the essence of the corresponding technical solutions deviate from the scope of the technical solutions of the embodiments of the present disclosure.

INDUSTRIAL APPLICABILITY

In conclusion, the present disclosure provides a mecanum wheel, a chassis, and an assistant robot. The mecanum wheel is compact in structure, and may form the mecanum wheel integrated with a drive device and a mecanum wheel body.

What is claimed is:

1. A mecanum wheel with a shock absorbing device, comprising the mecanum wheel and the shock absorbing device, the mecanum wheel comprising a mecanum wheel body and a drive device, wherein the mecanum wheel body is provided with a wheel axle hole; the drive device is partially or completely arranged in the wheel axle hole; an axis of a connecting shaft of the drive device is collinear with a rotary shaft of the mecanum wheel body, and the mecanum wheel body rotates along with a housing of the drive device; wherein the mecanum wheel is connected to the shock absorbing device;

wherein number of the shock absorbing device is one; the shock absorbing device is arranged on one side of the mecanum wheel, and the shock absorbing device is fixedly connected to the connecting shaft of the drive device of the mecanum wheel;

or, the number of the shock absorbing devices is two; the mecanum wheel is arranged between the two shock absorbing devices, and both shock absorbing devices are fixedly connected to the connecting shaft of the drive device of the mecanum wheel.

2. The mecanum wheel with the shock absorbing device according to claim 1, wherein the shock absorbing device comprises a shock absorbing fixed bracket and a shock absorbing moving bracket; the shock absorbing moving bracket is fixedly connected to the connecting shaft of the drive device of the mecanum wheel;

the shock absorbing fixed bracket comprises at least one shock absorbing fixed shaft; the shock absorbing moving bracket is sleeved outside the shock absorbing fixed shaft and is capable of moving reciprocally in a longitudinal direction of the shock absorbing fixed shaft;

two elastic elements are sleeved outside the shock absorbing fixed shaft; the shock absorbing moving bracket is connected between the two elastic elements;

the longitudinal direction of the shock absorbing fixed shaft and an axial direction of the connecting shaft of the drive device are arranged at an included angle.

3. The mecanum wheel with the shock absorbing device according to claim 2, wherein the shock absorbing fixed bracket comprises a first shock absorbing fixed part, a second shock absorbing fixed part, and a third shock absorbing fixed part;

the first shock absorbing fixed part is fixedly connected to the second shock absorbing fixed part through the shock absorbing fixed shaft;

the third shock absorbing fixed part is fixedly connected to the first shock absorbing fixed part and the second shock absorbing fixed part.

4. The mecanum wheel with the shock absorbing device according to claim 3, wherein the second shock absorbing fixed part is detachably and fixedly connected to the third shock absorbing fixed part, and at least one shock absorbing adjusting piece is arranged between the second shock absorbing fixed part and the third shock absorbing fixed part;

the shock absorbing adjusting piece comprises a wedge-shaped structure;

in the longitudinal direction of the shock absorbing fixed shaft, the shock absorbing adjusting piece is capable of moving to change the distance between the second shock absorbing fixed part and the third shock absorbing fixed part.

5. The mecanum wheel with the shock absorbing device according to claim 4, wherein the shock absorbing adjusting piece comprises an adjusting fitting part and an adjusting threaded part that is fixedly connected to the adjusting fitting part; the adjusting fitting part is of a wedge-shaped structure;

the adjusting fitting part is arranged between the second shock absorbing fixed part and the third shock absorbing fixed part;

the adjusting threaded part is in threaded connection with an adjusting nut; the adjusting nut is pressed against one surface, away from the shock absorbing moving bracket, of the second shock absorbing fixed part;

when the adjusting nut is rotated, the shock absorbing adjusting piece is capable of moving to change the distance between the second shock absorbing fixed part and the third shock absorbing fixed part.

6. The mecanum wheel with the shock absorbing device according to claim 1, wherein the shock absorbing device comprises a shock absorbing fixed bracket and a shock absorbing moving bracket; the shock absorbing moving bracket is fixedly connected to the connecting shaft of the drive device of the mecanum wheel;

the shock absorbing fixed bracket comprises at least one shock absorbing fixed shaft; the shock absorbing moving bracket is sleeved outside the shock absorbing fixed shaft and is capable of moving reciprocally in a longitudinal direction of the shock absorbing fixed shaft;

elastic elements which are pressed against the shock absorbing moving bracket are sleeved outside the shock absorbing fixed shaft; the elastic elements are in a compressed state;

the longitudinal direction of the shock absorbing fixed shaft and an axial direction of the connecting shaft of the drive device are arranged at an included angle.

7. The mecanum wheel with the shock absorbing device according to claim 6, wherein the shock absorbing fixed bracket comprises a shock absorbing fixing leveling mounting piece and a shock absorbing fixing leveling shafting piece;

the shock absorbing fixing leveling mounting piece is configured to be fixedly connected to an equipment;

the shock absorbing fixing leveling shafting piece is detachably and fixedly connected to the shock absorbing fixed shaft; a shock absorbing fixed shaft stop part is formed at an end, opposite to another end connected with the shock absorbing fixing leveling shafting piece, of the shock absorbing fixed shaft; the elastic elements and the shock absorbing moving bracket are arranged between the shock absorbing fixed shaft stop part and the shock absorbing fixing leveling shafting piece;

the shock absorbing fixing leveling mounting piece is hinged to the shock absorbing fixing leveling shafting piece, and the shock absorbing fixing leveling mounting piece and the shock absorbing fixing leveling shafting piece are connected to a leveling connecting piece; the leveling connecting piece is capable of adjusting the angle between the shock absorbing fixing leveling mounting piece and the shock absorbing fixing leveling shafting piece.

8. The mecanum wheel with the shock absorbing device according to claim 7, wherein the elastic elements are springs;

energy absorbing elements are sleeved outside the shock absorbing fixed shaft; the energy absorbing elements can deform elastically;

the shock absorbing moving bracket is arranged between the energy absorbing elements and the elastic elements.

9. An assistant robot, comprising a chassis, the chassis comprises at least one pair of mecanum wheels with shock absorbing devices, each of the at least one pair of mecanum wheels with shock absorbing devices comprises a corresponding one of the shock absorbing devices and a corresponding one of the mecanum wheels, each of the mecanum wheels comprising a mecanum wheel body and a drive device, wherein the mecanum wheel body is provided with a wheel axle hole; the drive device is partially or completely arranged in the wheel axle hole; the axis of a connecting shaft of the drive device is collinear with a rotary shaft of the mecanum wheel body, and the mecanum wheel body rotates along with a housing of the drive device;

wherein each of the mecanum wheels is connected to a corresponding one of the shock absorbing devices;

the assistant robot further comprising a hip supporting strap, a waist holding strap, and a robot body, wherein the chassis and a lifting support mechanism are arranged on the robot body;

the chassis is arranged at the bottom of the robot body;

the lifting support mechanism comprises a chest pressing plate; first connecting pieces are arranged on a lower end surface of the chest pressing plate, and second connecting pieces are arranged on a side wall of the chest pressing plate;

the hip supporting strap is provided with third connecting pieces that are matched and butted with the first connecting pieces; the waist holding strap is provided with fourth connecting pieces that are matched and butted with the second connecting pieces;

wherein the lifting support mechanism comprises a support rod; one end of the support rod is hinged to the robot body; a console is arranged at the other end of the support rod; the console is connected to handles and the chest pressing plate;

a drive assembly is further connected between the support rod and the robot body; the drive assembly is configured to switch the support rod between a sitting posture state and a standing posture state.

10. The assistant robot according to claim 9, wherein a power switch and at least two gears of speed regulating switches are arranged on the console;

a groove is formed in the console; the groove is configured to hold a remote control and charge the remote control;

wherein a control assembly is arranged in the robot body; the control assembly is connected to the drive assembly, and is configured to control the support rod to ascend and descend;

the remote control is connected to the control assembly in a wireless connection manner, and the remote control is configured to remotely control the assistant robot to move, wherein when the power switch is turned on, the assistant robot is in a braking state by default;

a control switch is arranged on the remote control, and when both the control switch and the power switch are in an on-state, the remote control is configured to remotely control the assistant robot to move, or control the assistant robot to perform posture transformation, horizontal movement, or rotation movement.

11. The assistant robot according to claim 9, wherein the robot body comprises a vehicle body, and the chassis connected to the bottom end area of the vehicle body; the lifting support mechanism is connected to the vehicle body; a footrest supporting plate is further arranged on the chassis;

the vehicle body is connected to a knee pressing mechanism;

the knee pressing mechanism comprises a horizontal beam; one end of the horizontal beam is connected to the vehicle body; the other end of the horizontal beam is connected to a cross beam; two knee pressing plates that are movably connected are symmetrically arranged on the cross beam.

12. The assistant robot according to claim 11, wherein the horizontal beam comprises a primary beam and a secondary beam; one end of the primary beam is connected to the vehicle body; one end of the secondary beam passes through the primary beam and is arranged in the primary beam, and the other end of the secondary beam is connected to the knee pressing plates;

the secondary beam is capable of driving the knee pressing plates to move in the direction, away from or towards the vehicle body, relative to the primary beam and be fixed.

* * * * *